(12) United States Patent
Baptist et al.

(10) Patent No.: US 9,749,419 B2
(45) Date of Patent: Aug. 29, 2017

(54) CHECK OPERATION DISPERSED STORAGE NETWORK FRAME

(71) Applicant: International Business Machines Corporation, Armonk, NY (US)

(72) Inventors: Andrew Baptist, Mt. Pleasant, WI (US); Wesley Leggette, Chicago, IL (US); Jason K. Resch, Chicago, IL (US); Zachary J. Mark, Chicago, IL (US); Ilya Volvovski, Chicago, IL (US); Greg Dhuse, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/348,099

(22) Filed: Nov. 10, 2016

(65) Prior Publication Data
US 2017/0063993 A1 Mar. 2, 2017

Related U.S. Application Data

(63) Continuation of application No. 14/176,807, filed on Feb. 10, 2014, now Pat. No. 9,524,267, which is a
(Continued)

(51) Int. Cl.
*H04L 29/08* (2006.01)
*H04L 29/06* (2006.01)
(Continued)

(52) U.S. Cl.
CPC .......... *H04L 67/1097* (2013.01); *G06F 3/064* (2013.01); *G06F 3/065* (2013.01);
(Continued)

(58) Field of Classification Search
CPC . H04L 67/1097; H04L 69/22; H04L 67/1008; G06F 3/067; G06F 3/0619;
(Continued)

(56) References Cited

U.S. PATENT DOCUMENTS 4,092,732 A 5/1978 Ouchi
5,454,101 A 9/1995 Mackay et al.
(Continued)

OTHER PUBLICATIONS

Chung; An Automatic Data Segmentation Method for 3D Measured Data Points; National Taiwan University; pp. 1-8; 1998.
(Continued)

*Primary Examiner* — Mohamed Kamara
(74) *Attorney, Agent, or Firm* — Garlick & Markison; Timothy W. Markison

(57) ABSTRACT

A method includes sending a set of check request messages to a set of storage units. A first check request message of the set of check request messages includes a first group of slice names that includes a first slice name from each of a plurality of sets of slice names, and the plurality of sets of slices names corresponds to a plurality of sets of encoded data slices. The method further includes receiving, by a first storage unit, the first check request message, determining a first group of slice information, and sending first check response message, where the first check response message includes the first group of slice information. The method further includes interpreting the first check response message in light of the first group of slice names to identify one or more encoded data slices of the plurality of sets of encoded data slices in need of rebuilding.

12 Claims, 27 Drawing Sheets

Related U.S. Application Data continuation of application No. 13/080,446, filed on Apr. 5, 2011, now Pat. No. 8,649,399, which is a continuation of application No. 13/073,948, filed on Mar. 28, 2011, now Pat. No. 8,625,635.

(60) Provisional application No. 61/328,000, filed on Apr. 26, 2010.

(51) Int. Cl.
*G06F 15/167* (2006.01)
*G06F 3/06* (2006.01)
*G06F 11/10* (2006.01)

(52) U.S. Cl.
CPC ............ *G06F 3/067* (2013.01); *G06F 3/0619* (2013.01); *G06F 3/0644* (2013.01); *G06F 11/1076* (2013.01); *G06F 15/167* (2013.01); *H04L 69/22* (2013.01); *H04L 69/26* (2013.01)

(58) Field of Classification Search
CPC ............ G06F 17/30194; G06F 3/0656; G06F 3/0689; H04N 21/231
See application file for complete search history.

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,356,951 B1 | 3/2002 | Gentry, Jr. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,512,767 B1 | 1/2003 | Takeda et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,308,702 B1 | 12/2007 | Thomsen et al. |
| 7,472,241 B2 | 12/2008 | Uchiyama et al. |
| 7,636,724 B2 | 12/2009 | de la Torre et al. |
| 8,296,386 B1 | 10/2012 | Micalizzi, Jr. |
| 2002/0062422 A1 | 5/2002 | Butterworth et al. |
| 2002/0114328 A1 | 8/2002 | Miyamoto et al. |
| 2002/0124111 A1 | 9/2002 | Desai et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0051195 A1 | 3/2003 | Bosa et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0078683 A1 | 4/2004 | Buia et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0155894 A1 | 7/2006 | Pennington |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0263618 A1 | 11/2007 | Ornes et al. |
| 2007/0283167 A1 | 12/2007 | Venters et al. |
| 2008/0008183 A1 | 1/2008 | Takagaki et al. |
| 2008/0162811 A1 | 7/2008 | Steinmetz et al. |
| 2009/0094251 A1 | 4/2009 | Gladwin et al. |
| 2009/0094318 A1 | 4/2009 | Gladwin et al. |
| 2010/0017531 A1 | 1/2010 | Dhuse et al. |
| 2010/0023524 A1 | 1/2010 | Gladwin et al. |
| 2011/0167221 A1* | 7/2011 | Pangal ................ G06F 11/1453 711/117 |
| 2011/0261813 A1 | 10/2011 | Baptist et al. |
| 2011/0261839 A1 | 10/2011 | Baptist et al. |
| 2011/0264823 A1 | 10/2011 | Baptist et al. |
| 2011/0264962 A1 | 10/2011 | Baptist et al. |
| 2012/0030371 A1 | 2/2012 | Baptist et al. |
| 2012/0047226 A1 | 2/2012 | Shinomiya |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

International Search Report and Written Opinion; PCT Application No. PCT/US11/33745; Jun. 28, 2011; 12 pagres.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

(56) References Cited

OTHER PUBLICATIONS

Sermersheim; Lightweight Directory Access Protocol (LDAP): The Protocol; IETF Network Working Group; RFC 4511; Jun. 2006; pp. 1-68.
Shamir; How to Share a Secret; Communications of the ACM; vol. 22, No. 11; Nov. 1979; pp. 612-613.
Smith; Lightweight Directory Access Protocol (LDAP): String Representation of Search Filters; IETF Network Working Group; RFC 4515; Jun. 2006; pp. 1-12.
Smith; Lightweight Directory Access Protocol (LDAP): Uniform Resource Locator; IETF Network Working Group; RFC 4516; Jun. 2006; pp. 1-15.
Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.

\* cited by examiner computing system 10

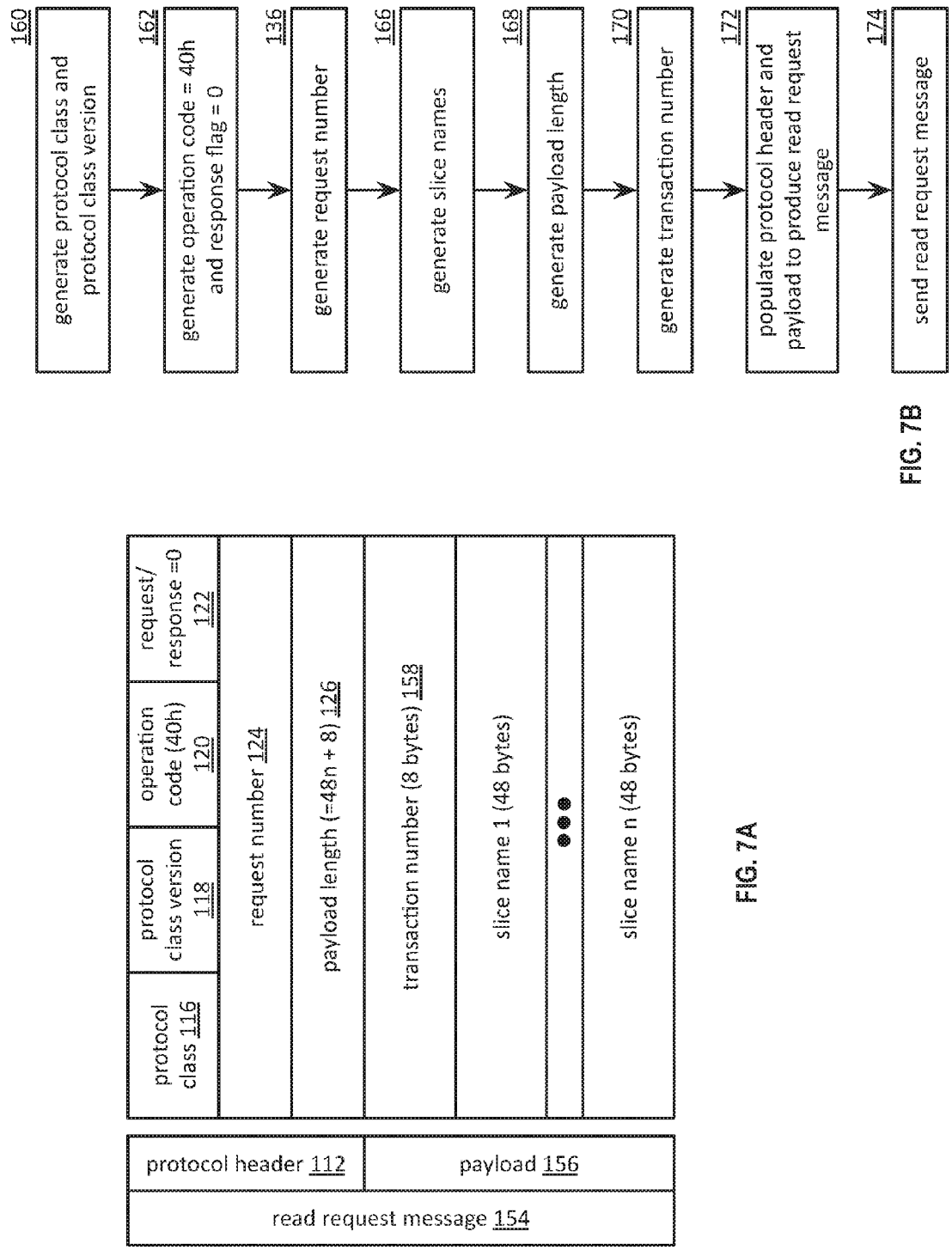

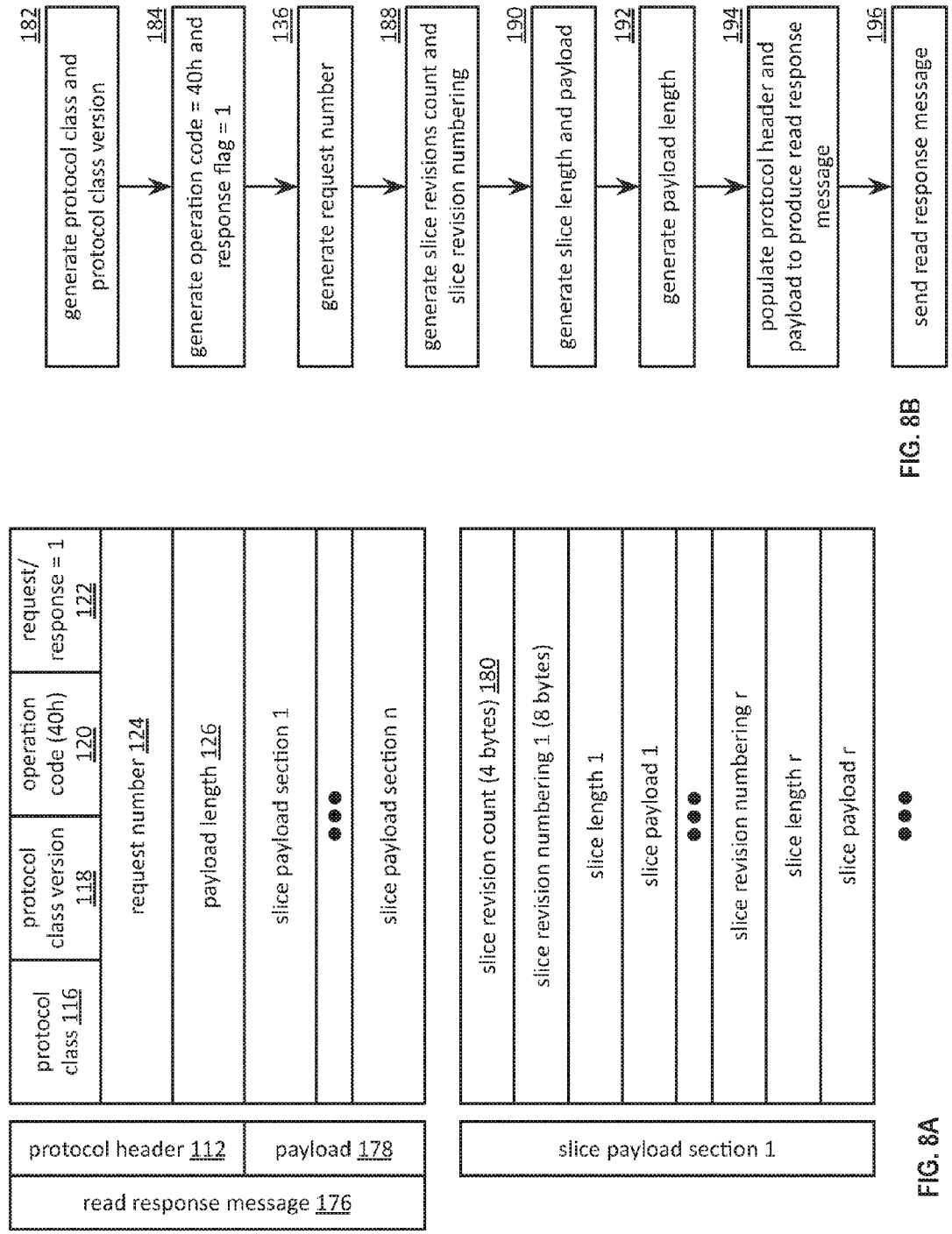

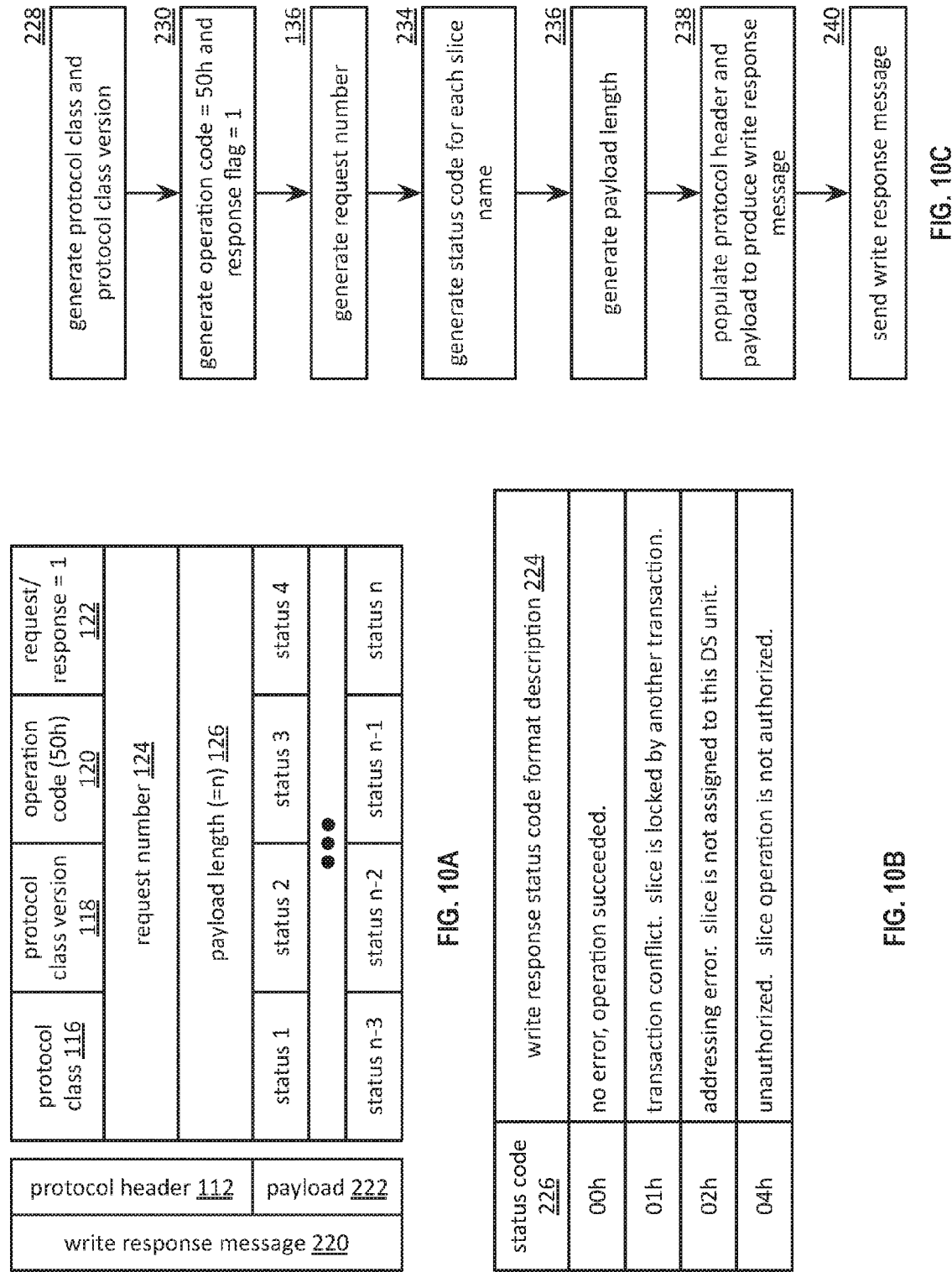

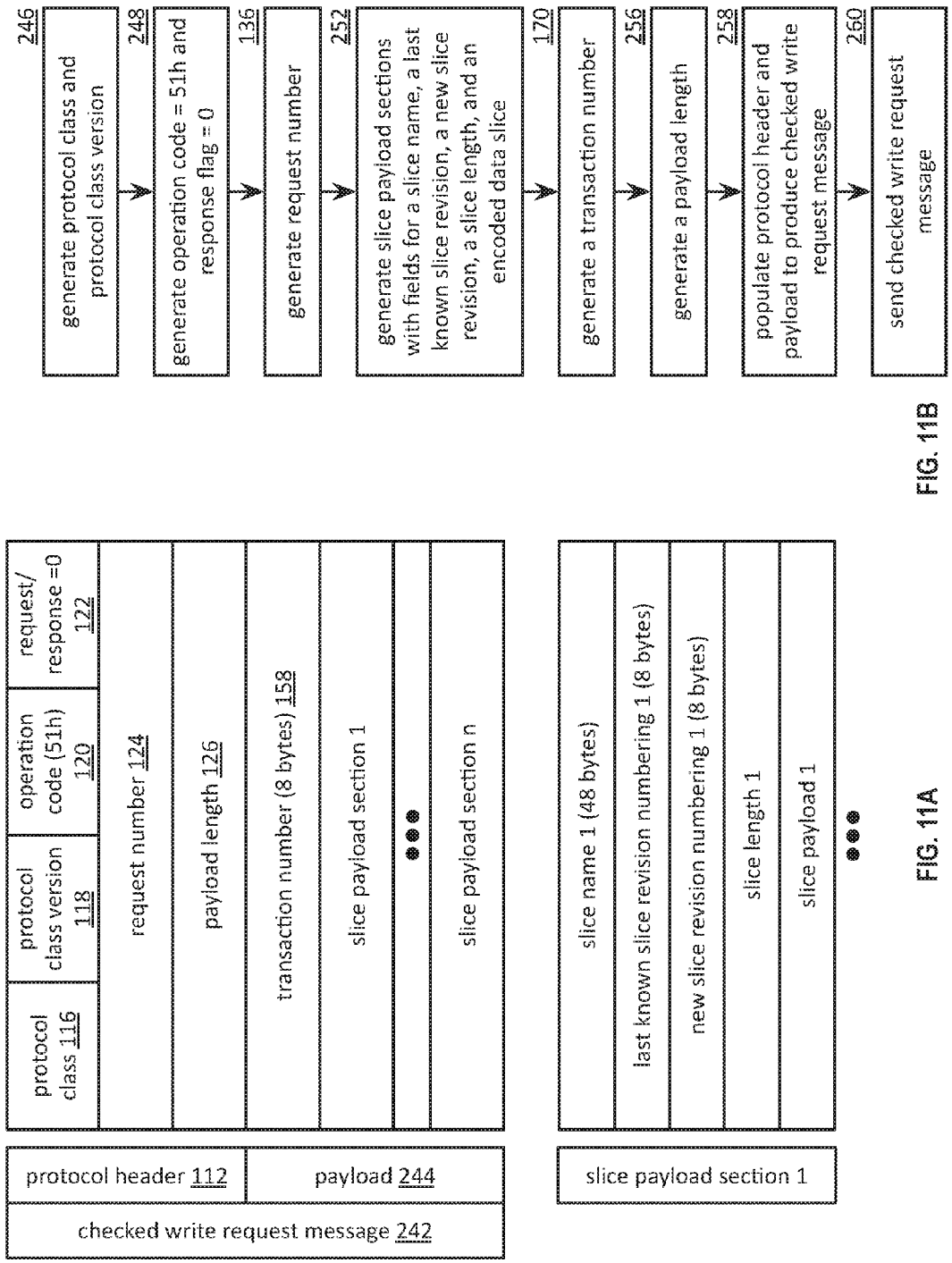

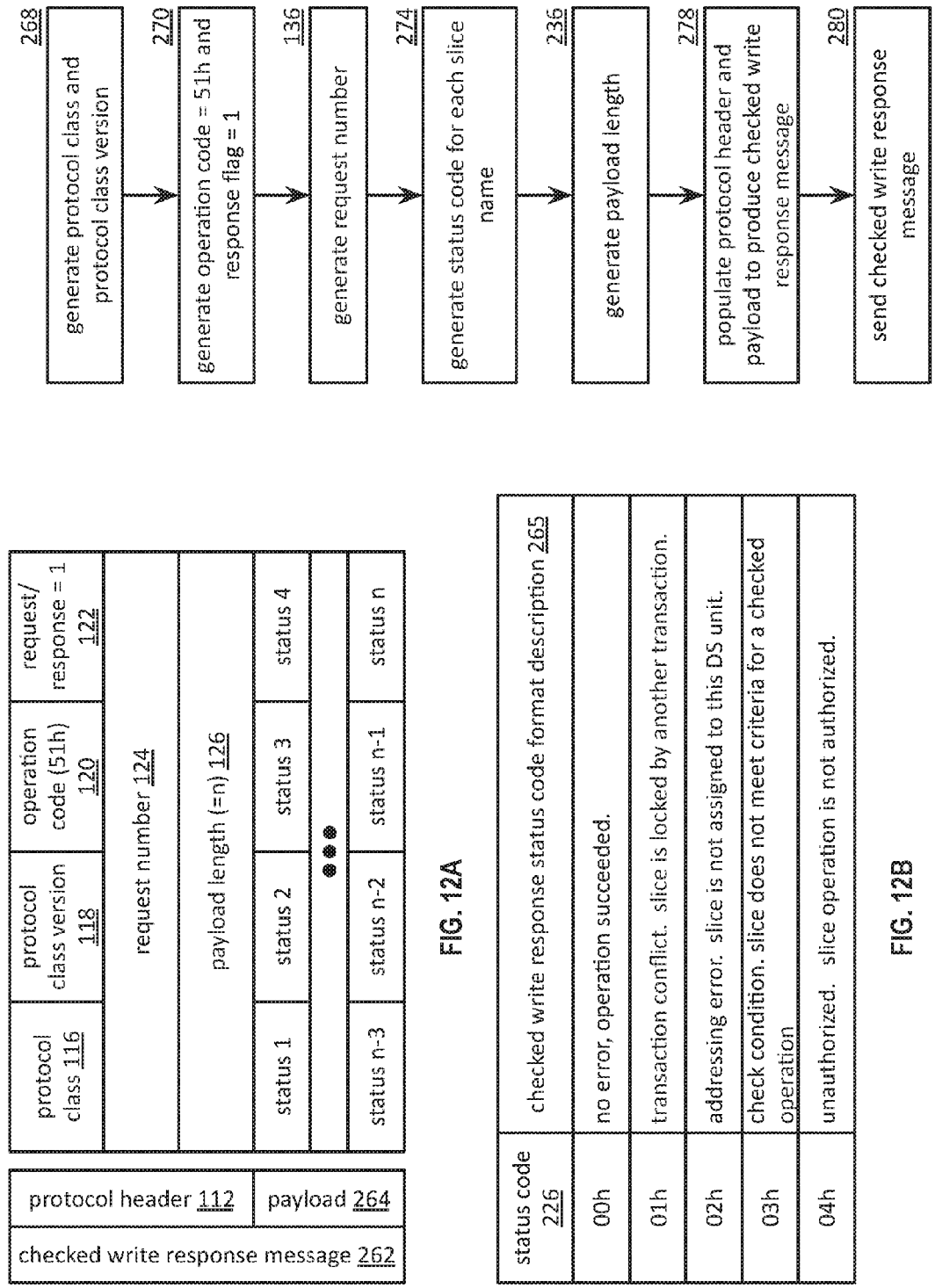

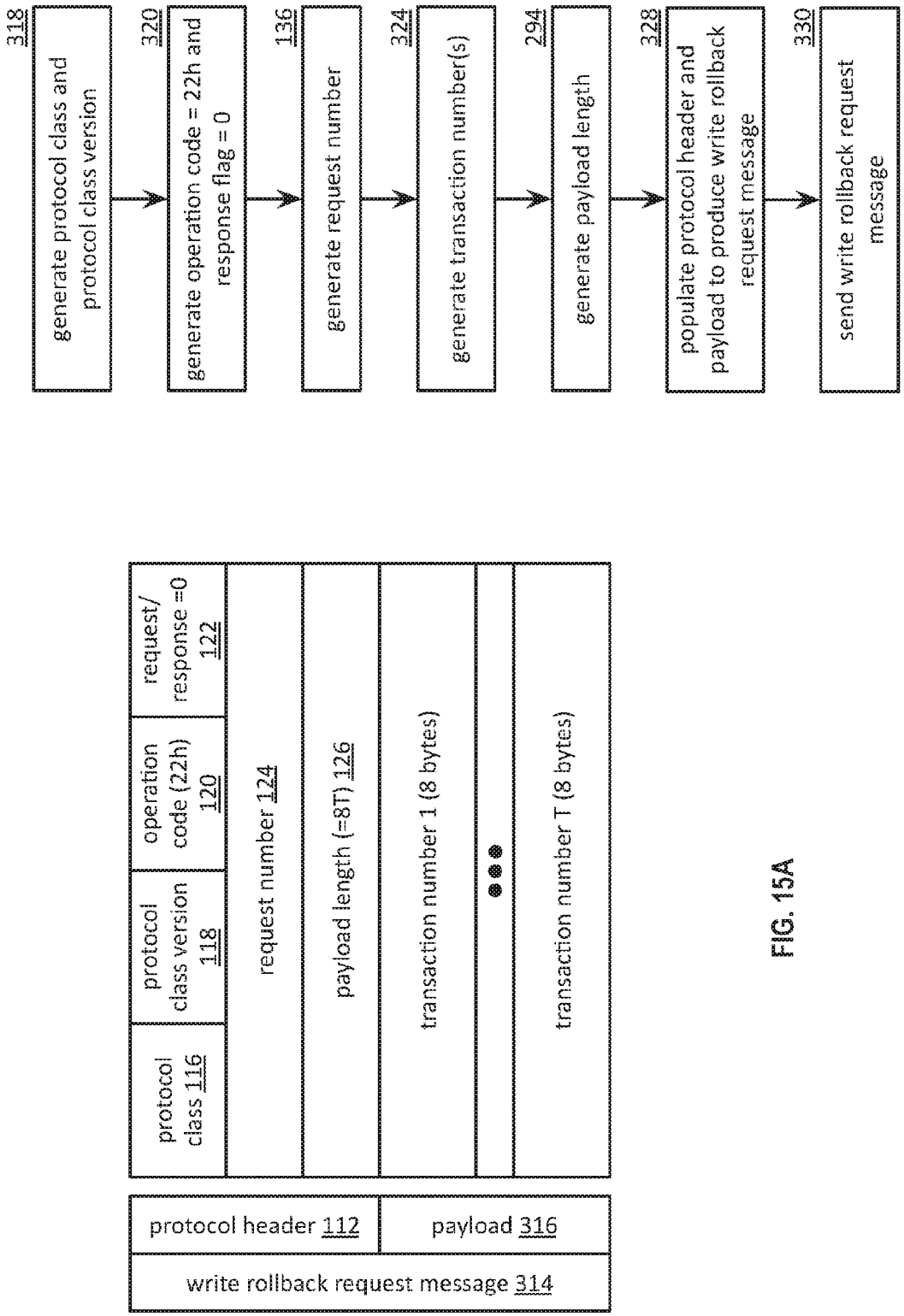

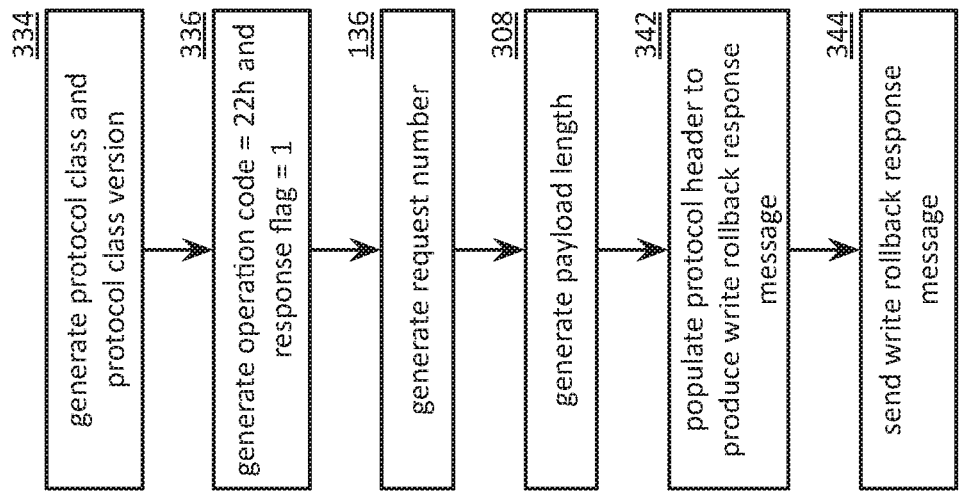
FIG. 16B
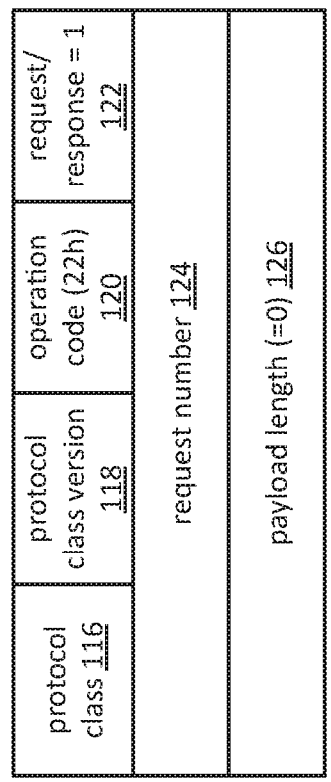
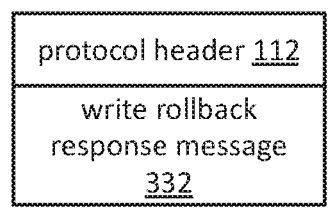
FIG. 16A

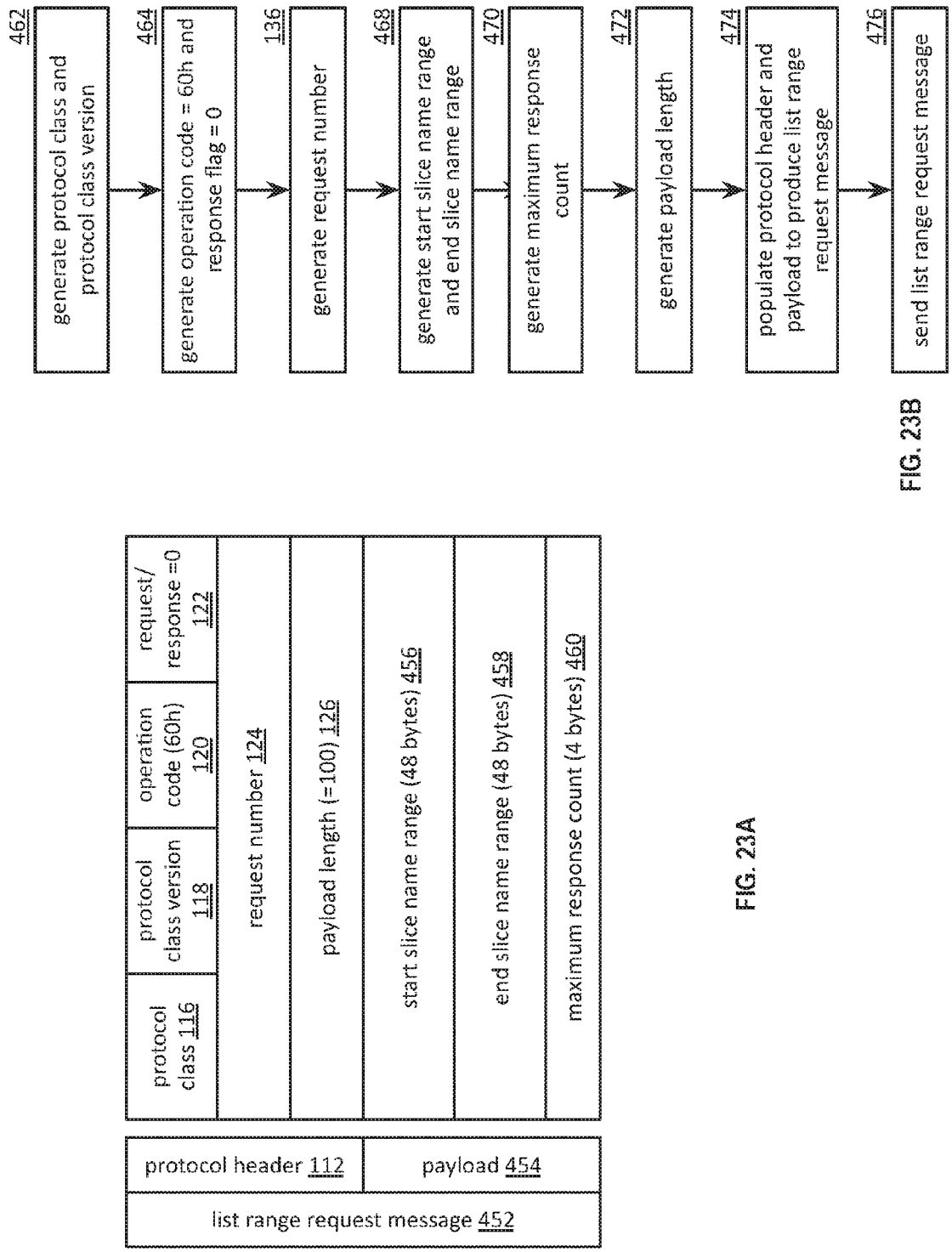

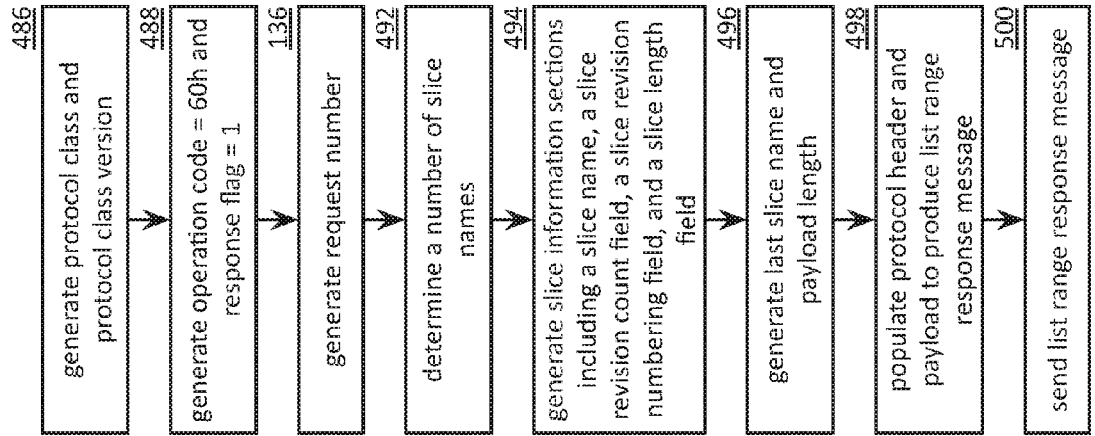
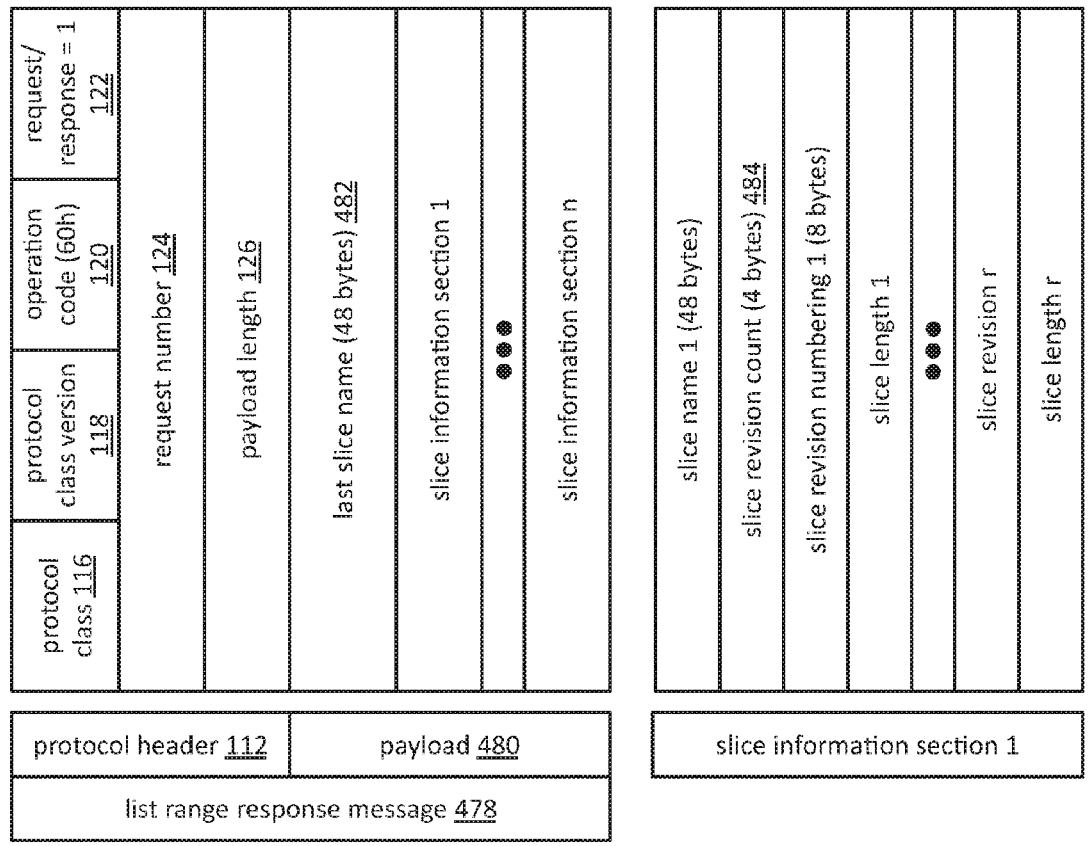
FIG. 24B
FIG. 24A

CHECK OPERATION DISPERSED STORAGE NETWORK FRAME

CROSS REFERENCE TO RELATED PATENTS

The present U.S. Utility patent application claims priority pursuant to 35 U.S.C. §120 as a continuation of U.S. Utility application Ser. No. 14/176,807, entitled "CHECK OPERATION DISPERSED STORAGE NETWORK FRAME," filed Feb. 10, 2014, which is a continuation of U.S. Utility application Ser. No. 13/080,446, entitled, "CHECK OPERATION DISPERSED STORAGE NETWORK FRAME," filed Apr. 5, 2011, now U.S. Pat. No. 8,649,399, issued on Feb. 11, 2014, which claims priority pursuant to 35 U.S.C. §119(e) to U.S. Provisional Application No. 61/328,000, entitled, "DISPERSED STORAGE SYSTEM ACCESS PROTOCOL FORMAT AND METHOD," filed Apr. 26, 2010, all of which are incorporated herein by reference in their entirety and made part of the present U.S. Utility patent application for all purposes.

U.S. Utility patent application Ser. No. 13/080,446 claims priority pursuant to 35 U.S.C. §120 as a continuation of U.S. Utility application Ser. No. 13/073,948, entitled, "DISPERSED STORAGE NETWORK FRAME PROTOCOL HEADER," filed Mar. 28, 2011, now U.S. Pat. No. 8,625,635 issued on Jan. 7, 2014, which claims priority pursuant to 35 U.S.C. §119(e) to U.S. Provisional Application No. 61/328,000, entitled, "DISPERSED STORAGE SYSTEM ACCESS PROTOCOL FORMAT AND METHOD," filed Apr. 26, 2010, all of which are incorporated herein by reference in their entirety and made part of the present U.S. Utility patent application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computing systems and more particularly to data storage solutions within such computing systems.

Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc., are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 7A is a diagram illustrating an example of a read request message format in accordance with the invention;

FIG. 7B is a flowchart illustrating an example of generating a read request message in accordance with the invention;

FIG. 8A is a diagram illustrating an example of a read response message format in accordance with the invention;

FIG. 8B is a flowchart illustrating an example of generating a read response message in accordance with the invention;

FIG. 10A is a diagram illustrating an example of a write response message format in accordance with the invention;

FIG. 10B is a table illustrating an example of a write response status code format in accordance with the invention;

FIG. 10C is a flowchart illustrating an example of generating a write response message in accordance with the invention;

FIG. 11A is a diagram illustrating an example of a checked write request message format in accordance with the invention;

FIG. 11B is a flowchart illustrating an example of generating a checked write request message in accordance with the invention;

FIG. 12A is a diagram illustrating an example of a checked write response message format in accordance with the invention;

FIG. 12B is a table illustrating an example of a checked write response status code format in accordance with the invention;

FIG. 12C is a flowchart illustrating an example of generating a checked write response message in accordance with the invention;

FIG. 15A is a diagram illustrating an example of a write rollback request message format in accordance with the invention;

FIG. 15B is a flowchart illustrating an example of generating a write rollback request message in accordance with the invention;

FIG. 16A is a diagram illustrating an example of a write rollback response message format in accordance with the invention;

FIG. 16B is a flowchart illustrating an example of generating a write rollback response message in accordance with the invention;

FIG. 23A is a diagram illustrating an example of a list range request message format in accordance with the invention;

FIG. 23B is a flowchart illustrating an example of generating a list range request message in accordance with the invention;

FIG. 24A is a diagram illustrating an example of a list range response message format in accordance with the invention;

FIG. 24B is a flowchart illustrating an example of generating a list range response message in accordance with the invention;

DETAILED DESCRIPTION OF THE INVENTION

Figure 1:
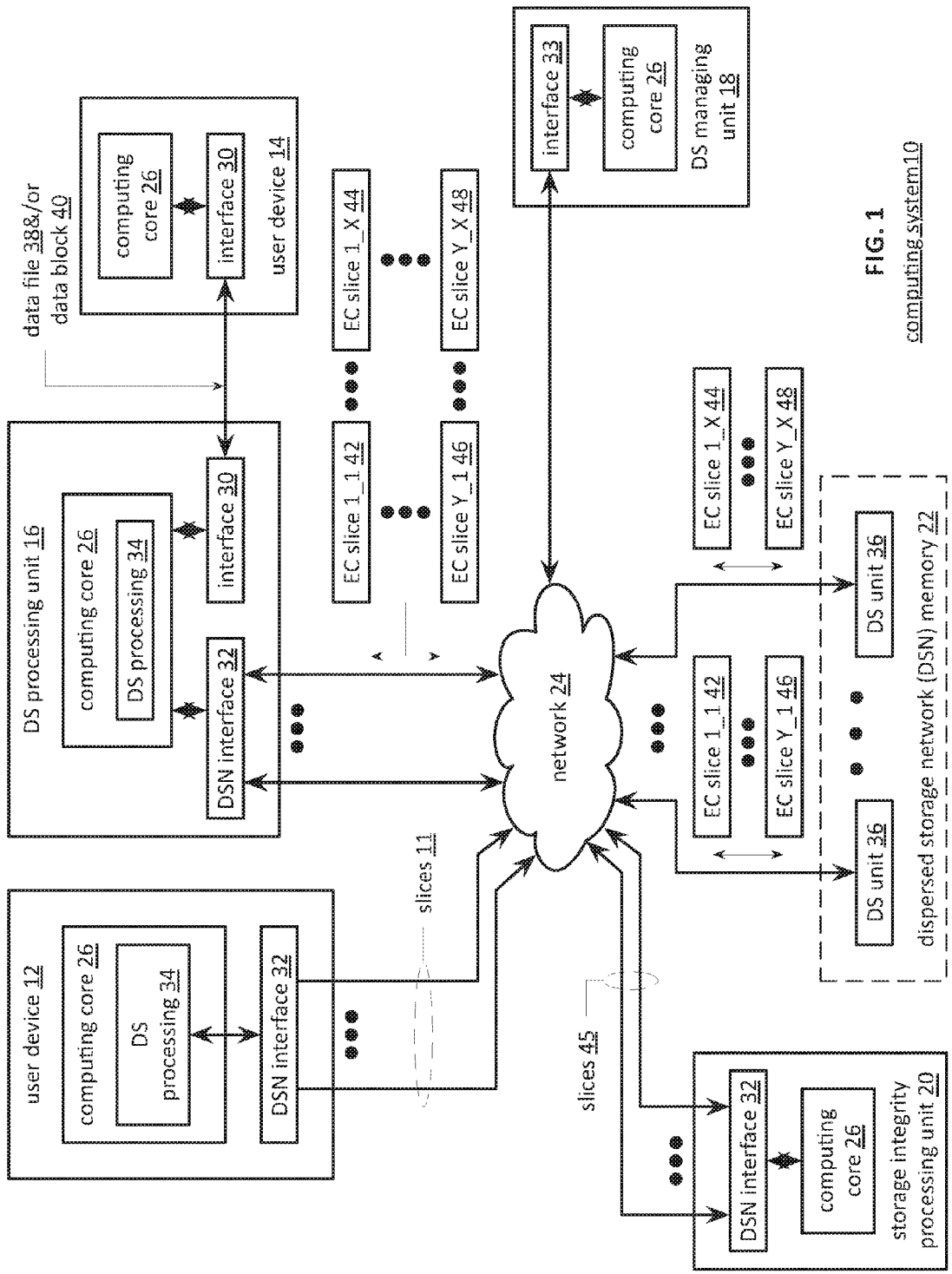
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-26B.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interface 30 supports a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general, and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing unit 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security. Further examples of encoding the data segments will be provided with reference to one or more of FIGS. 2-26B.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
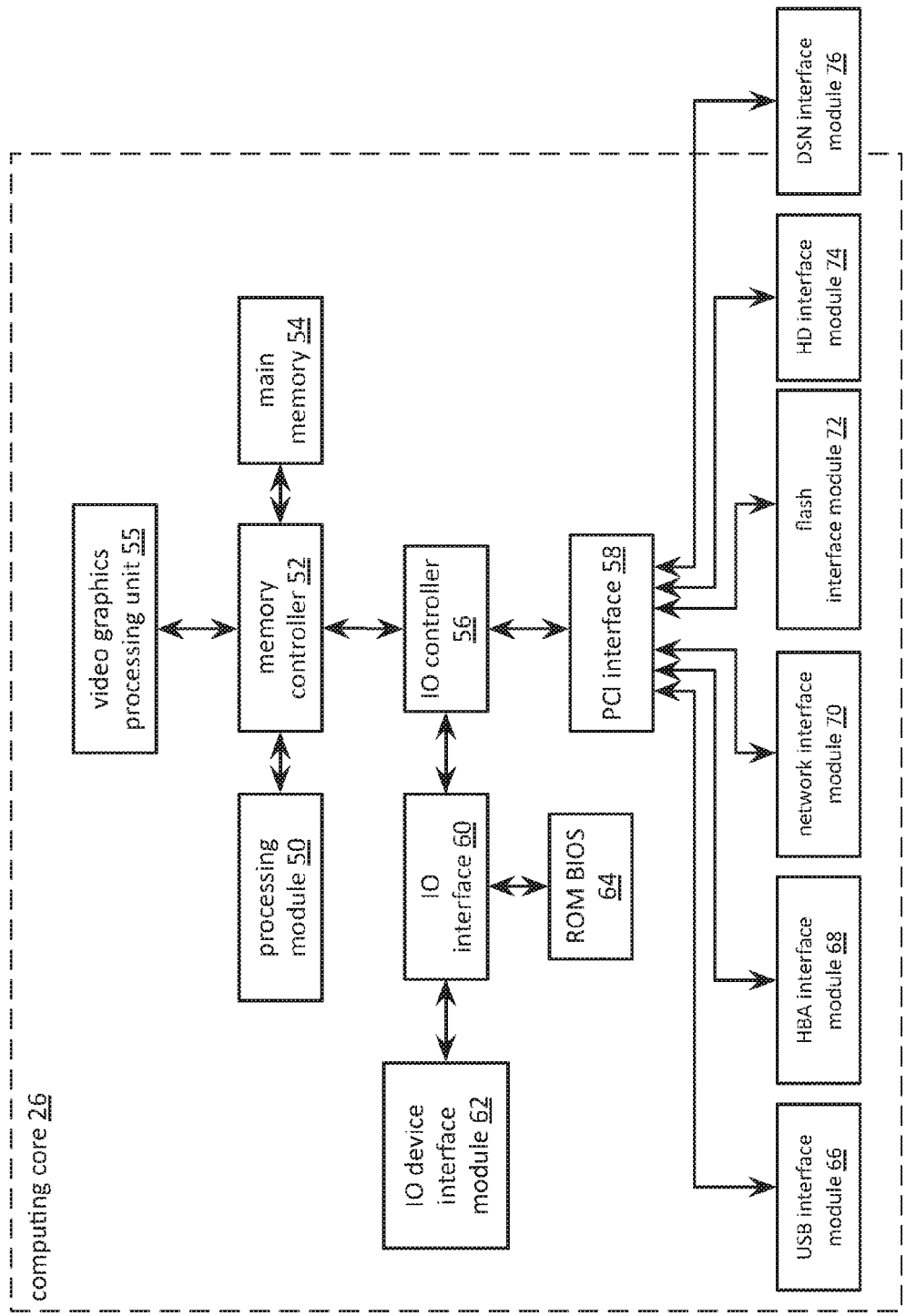
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-26B.

Figure 3:
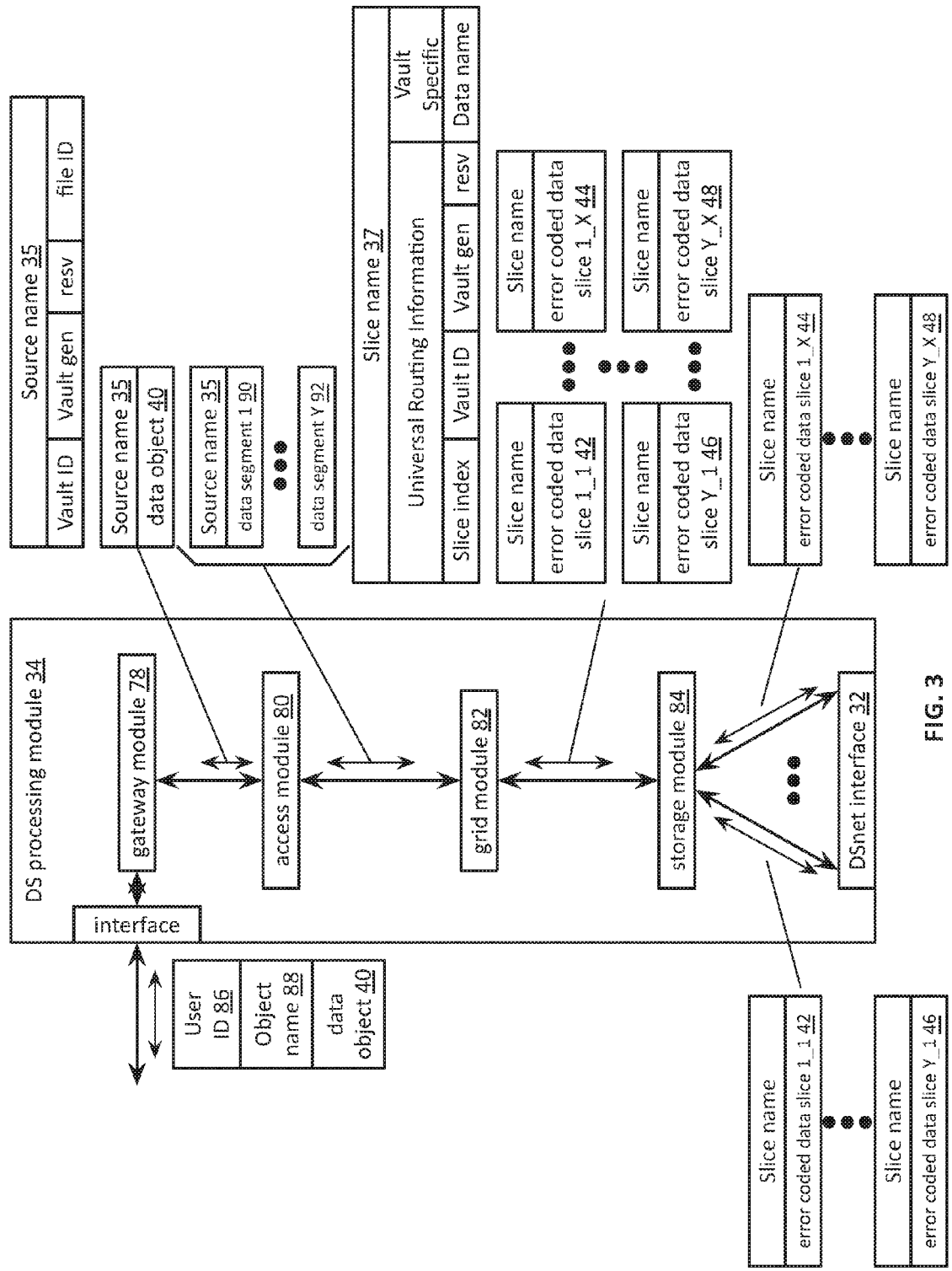
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16-10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figures 4, 5:
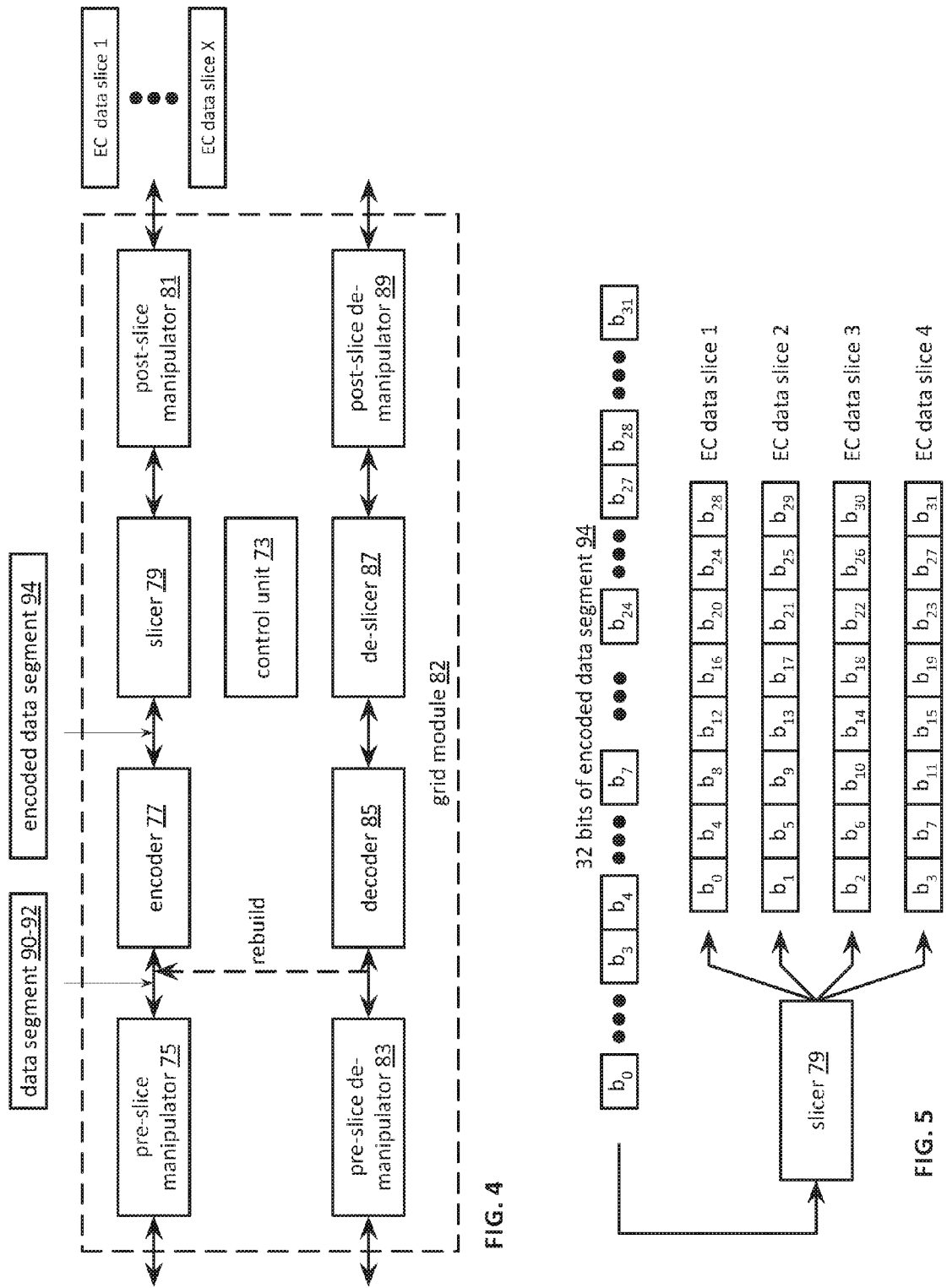
FIG. 4 is a schematic block diagram of an embodiment of a grid module in accordance with the invention.
FIG. 5 is a diagram of an example embodiment of error coded data slice creation in accordance with the invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6B:
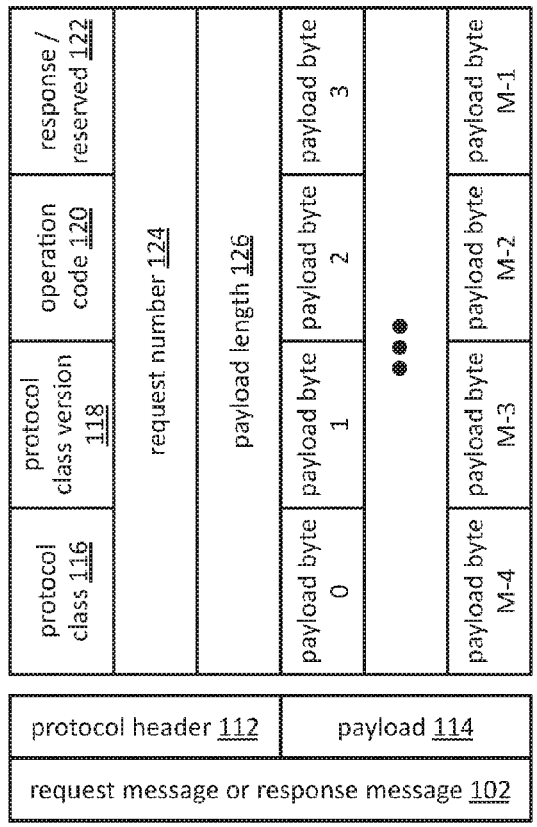
FIG. 6B is a diagram of an embodiment of a message format in accordance with the invention.
Figure 6A:
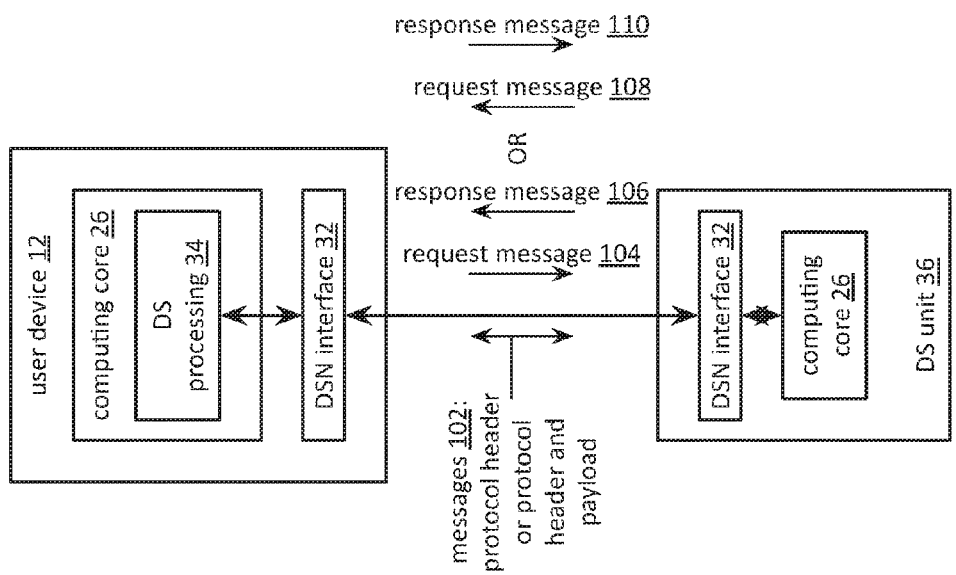
FIG. 6A is a schematic block diagram of another embodiment of a computing system in accordance with the invention.

FIG. 6A is a schematic block diagram of another embodiment of a computing system that includes a user device 12 and a dispersed storage (DS) unit 36. The user device 12 includes a computing core 26 and a dispersed storage network (DSN) interface 32. The computing core 26 includes a DS processing 34. The DS unit 36 includes a computing core 26 and the DSN interface 32. The user device 12 and the DS unit 36 are operably coupled via a local area network, a wide area network, the Internet, etcetera to enable the DSN interface 32 of the user device 12 and of the DS unit 36 to communicate. The DSN interface 32 of the user device 12 and/or of the DS unit 36 generates one or more DSN frames to communicate a message 102 therebetween. The DSN frame includes a protocol header and may further include a payload. A format of the DSN frame is discussed in greater detail with reference to FIG. 6B.

A message 102 may be a request message 104, 108 (e.g., read, write, checked write, write commit, write rollback, write finalize, write undo, check request, list request, and/or list digest request) or a response message 106, 110. For example, user device 12, as a requester, generates a request message 104, 108 and sends it to DS unit 36. DS unit 36, as a responder, generates a response message 106, 110 and sends it to user device 12. In this example, the DS processing 34 of the user device 12 (e.g., the requester) generates a request and outputs the request to the DSN interface 32 of the user device 12. The DSN interface 32 of the user device 12 formats the request into the request message 104 (which includes a DSN frame or DSN frames) and sends it to the DS unit 36 (e.g., the responder). The DSN interface of the DS unit 36 extracts the request from the request message 104 and provides to the computing core 26, which generates a response thereto. The computing core 26 provides the response to the DSN interface 32 of the DS unit 36, which formats the response into the response message 106 (which includes one or more DSN frames) and sends it to user device 12.

Requester and responder roles may change depending on which device of the system initiates the request/response message pair. For example, DS unit 36 (e.g., the requester) generates a request message 108 and sends it to the user device 12 (e.g., the responder). The user device 12 generates a response message 110 and sends it to the DS unit 36. Various modules and/or units of the system may utilize the request/response message pairs. In addition, a request may send a request message 104, 108 to multiple responders in a series and/or parallel manner as will be discussed in greater detail with reference to FIG. 6C.

FIG. 6B is a diagram of an embodiment of a response or request message formatted as a dispersed storage network (DSN) frame. The DSN frame includes a protocol header 112 and may further include a payload 114. The protocol header 112 includes information to request action and/or provide status. The payload 114 includes M payload bytes of supplemental information utilized in further action and/or in a response related to the information in the protocol header 112.

In an example, the protocol header 112 includes one or more of a protocol class field 116, a protocol class version field 118, an operation code field 120, a request/response field 122, a request number field 124, and a payload length field 126. The protocol class field 116 contains a number of bytes to specify a sub-protocol identifier to enable a plurality of families of protocols to be utilized. For example, the protocol class field 116 is one byte in length and includes a protocol class value of 01 hex to signify a first protocol class. The protocol class version field 118 contains a number of bytes to specify a sub-protocol version associated with the protocol class 116 enabling a plurality of versions of protocols to be utilized with each protocol class. For example, the protocol class version field is one byte in length and includes a protocol class version value of 01 hex to signify a first protocol class version.

The operation code field 120 contains a number of bytes to specify an operation code associated with a requested action providing message interpretation instructions to a message target. For example, the operation code field is one byte in length and includes an operation code value of a read operation. The request/response field 122 contains a number of bytes to specify whether the message is a request message or a response message. For example, the request/response field 122 is one byte in length and a one-bit flag of the byte (e.g., a most significant bit of the byte) indicates a response/reserve value. For example, a flag value of zero indicates that the message is a request message and a flag value of one indicates that the message is a response message.

The request number field 124 contains a number of bytes to include a request number value to associate at least one request message with at least one response message. The request number value may be produced as at least one of a random number, a random number plus a predetermined number, and based on a previous request number. For example, the request number field 124 is four bytes in length and includes a request number value of 457 to associate a read request message with a read response message when the previous request number value is 456. As another example, the request number field 124 includes a request number value of 5,358 to associate a read response message with a read request message when a request number value of 5,358 is extracted from the read request message.

The payload length field 126 contains a number of bytes to include a payload length value to indicate a number of bytes contained in the payload 114. The payload length value may be determined based on one or more of counting bytes of the payload 114, utilizing a predetermined number based on one or more of the protocol class value, the protocol class version value, the operation code value, and the response/reserved value. For example, the payload length field 126 is four bytes in length and includes a payload length value of zero when the operation code value is associated with a write rollback response operation and the response/reserved value is associated with a response message. As another example, the payload length field 126 includes a payload length value of 104 when the operation code value is associated with a read request message and a predetermined formula of 48n+8 associated with the read request message is utilized (e.g., where n=2 corresponding to 2 slice names).

The payload 114 may be organized into one or more payload fields in accordance with one or more of the values of the protocol class field 116, protocol class version field 118, the operation code field 120, and the request/response field 122. The one or more payload fields include payload bytes 0-M, wherein values of the payload bytes 0-M are established in accordance with the one or more payload fields. For example, the one or more payload fields include slice name fields when the payload 114 is associated with a read request DSN frame. As another example, the one or more payload fields include one or more encoded data slices when the payload 114 is associated with a read response DSN frame. Various methods to generate the fields of the DSN frame and/or to generate values for the fields are discussed in greater detail with reference to FIGS. 6D-26B.

Figure 6C:
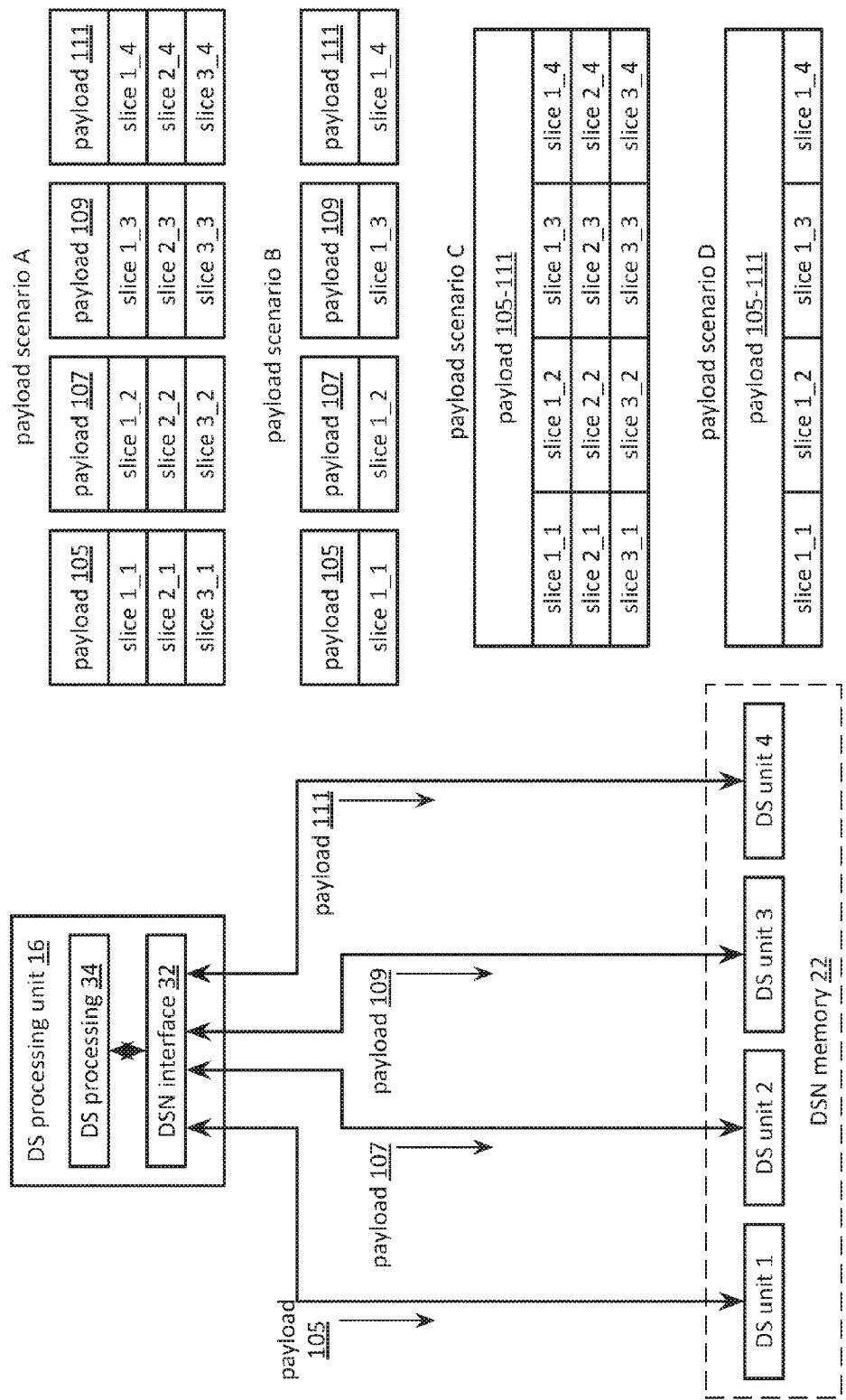
FIG. 6C is a schematic block diagram of another embodiment of a computing system in accordance with the invention.

FIG. 6C is a schematic block diagram of another embodiment of a computing system that includes a dispersed storage (DS) processing unit 16 and dispersed storage network (DSN) memory 22 operable to process a plurality of payload scenarios A-D. The DS processing unit 16 includes a DS processing 34 and a DSN interface 32. The DSN memory 22 includes DS units 1-4 when dispersed storage error coding parameters include a pillar width of 4. The DS processing unit 16 generates one or more request DSN frames (e.g., a common DSN frame for the DS units or an individual frame for each DS unit) wherein each DSN frame includes a payload. The DS processing unit 16 sends the one or more request DSN frames to DS units 1-4. For example, the DS processing unit 16 sends a first DSN frame that includes a payload 105 to DS unit 1, sends a second DSN frame that includes a payload 107 to DS unit 2, sends a third DSN frame that includes a payload 107 to DS unit 3, and sends a fourth DSN frame that includes a payload 111 to DS unit 4. Each payload 105-111 may contain unique data or may contain the same data. As a specific example, the DS processing unit 16 produces a plurality of encoded data slices, generates one or more write request messages that include the plurality of encoded data slices within one or more write request DSN frames, and sends the one or more write request DSN frames to the DSN memory 22 to facilitate storing the plurality of encoded data slices in the DS units 1-4.

In an example of operation, the DS processing 34 dispersed storage error encodes data utilizing the dispersed storage error coding parameters to produce 3 sets of encoded data slices 1_1 through 3_4 (e.g., set one includes slices 1-1 through 1_4). The DS processing 34 outputs a write request that includes three sets of encoded data slices to the DSN interface 32. The DSN interface 32 generates at least one write request DSN frame that includes a payload section, which includes an encoded data slice(s) of the three sets of encoded data slices. The DSN interface 32 sends the write request DSN frame(s) to the DS units 1-4. For instance, the DS interface 32 sends the write request DSN frame that includes payload 105 to DS unit 1; sends the write request DSN frame that includes payload 107 to DS unit 2; sends the write request DSN frame that includes payload 109 to DS unit 3: and sends the write request DSN frame that includes payload 111 to DS unit 4.

The DS processing unit 16 selects an encoded data slice to include in each of the payloads 105-111 in one of a variety of ways. For example, the DS processing unit 16 selects slices having the same pillar number to include in a payload (e.g., pillar one slices of the sets of encoded data slices are included in the payload 105). As another example, DS processing unit 16 selects the encoded data slices of a set of encoded data slices to include in a payload. As yet another example, the DS processing unit 16 selects a slice to include in the payload. As a further example, the DS processing unit 16 selects the encoded data slices of the three sets of encoded data slices to include in the payload.

The payload scenarios A-D represent example scenarios indicating which encoded data slices of the three sets of encoded data slices are included in the payloads 105-107. Payload scenario A represents a scenario where the DS processing unit 16 selects all slices of the corresponding pillar of the three sets of encoded data slices per payload. For example, the DS processing unit 16 selects slices 1_1, 2_1, and 3_1 of pillar 1 to be included in payload 105, slices 1_2, 2_2, and 3_2 of pillar 2 to be included in payload 107, slices 1_3, 2_3, and 3_3 of pillar 3 to be included in payload 109, and slices 1_4, 2_4, and 3_4 of pillar 4 to be included in payload 111. Payload scenario B represents a scenario where the DS processing unit 16 selects one slice of the corresponding pillar of the three sets of encoded data slices per payload. For example, the DS processing unit 16 selects slice 1_1 of pillar 1 to be included in payload 105, slice 1_2 of pillar 2 to be included in payload 107, slice 1_3 of pillar 3 to be included in payload 109, and slice 1_4 of pillar 4 to be included in payload 111.

Payload scenario C represents a scenario where the DS processing unit 16 selects all encoded data slices of the three sets of encoded data slices for all payloads 105-111. For example, the DSN interface 32 selects slices 1_1, 1_2, 1_3, 1_4, 2_1, 2_2, 2_3, 2_4, 3_1, 3_2, 3_3, and 3_4 to be included in each payload of payloads 105-111. Payload scenario D represents a scenario where the DS processing unit 16 selects one of encoded data slices of the three sets of encoded data slices for all payloads 105-111. For example, the DSN interface 32 selects slices 1_1, 1_2, 1_3, and 1_4 to be included in each payload of payloads 105-111.

Figure 6D:
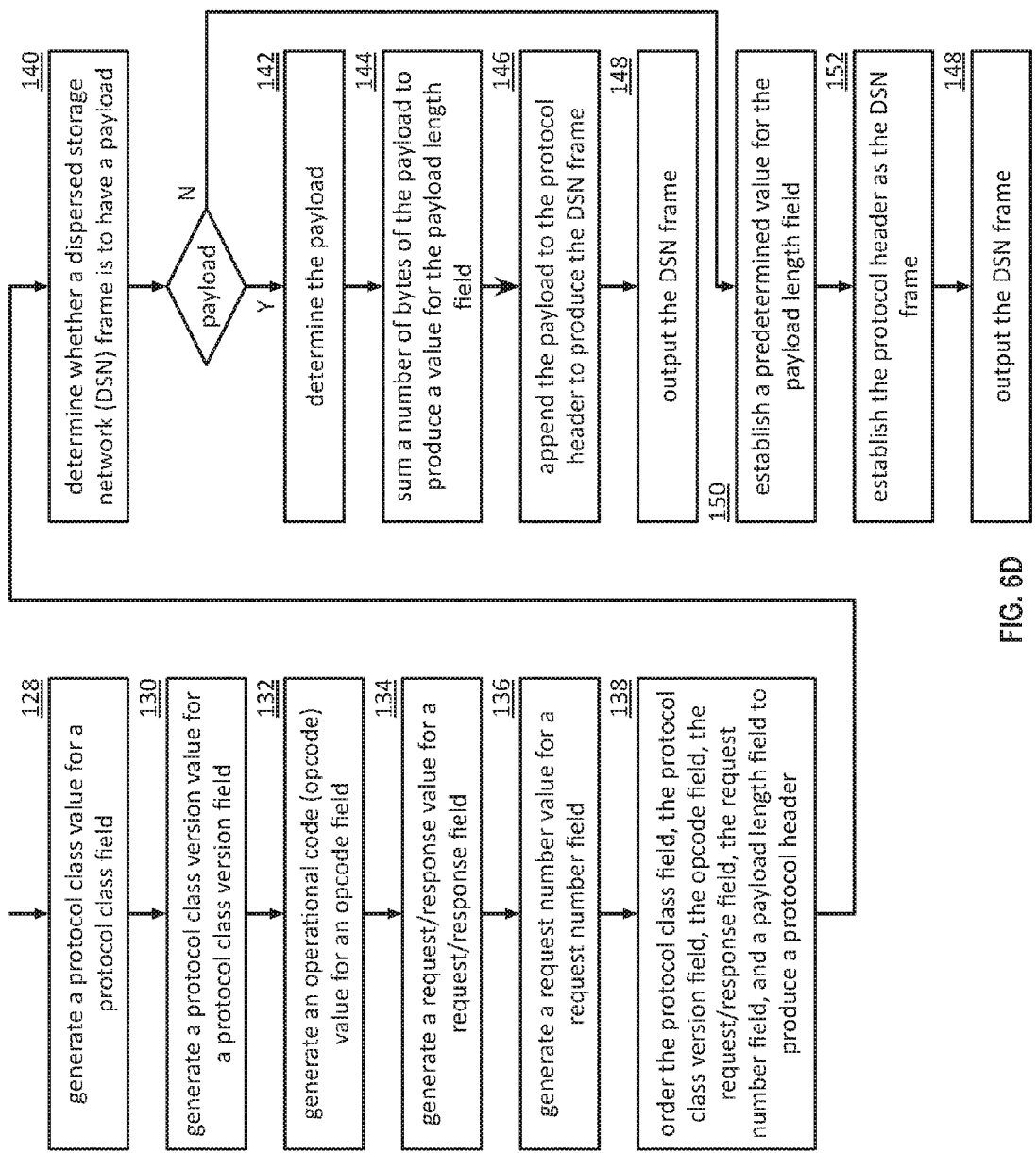
FIG. 6D is a flowchart illustrating an example of generating a protocol header of a dispersed storage network (DSN) frame in accordance with the invention.

FIG. 6D is a flowchart illustrating an example of generating a protocol header of a dispersed storage network (DSN) frame. The method begins at step 128 where a processing module generates values for a protocol class field, a protocol class version field, and an operation code (opcode) field based on an operational function being communicated by the DSN frame. The operational function includes at least one of a read operation, a check operation, a list range operation, a write operation, a checked write operation, a commit operation, a rollback operation, a finalize operation, an undo operation, and a list digest operation.

The processing module generates a protocol class value for the protocol class field by at least one of: retrieving the protocol class value from a protocol class list based on the operational function, utilizing the protocol class value of a request DSN frame (e.g., a DSN frame that includes a request message) when the DSN frame is a response DSN frame (e.g., a DSN frame that includes a response message), retrieving the protocol class value from a support protocol class list, retrieving the protocol class value from a unit-module type protocol class list, and extracting the protocol class value from a negotiation result. For example, the processing module generates a protocol class value of 01 when the protocol class value of a corresponding read request DSN frame has value of 01 and the operational function is a read response.

The method continues at step 130 where the processing module generates a protocol class version field. The processing module generates a protocol class version value for the protocol class version field by at least one of utilizing a most recent protocol class version value, retrieving the protocol class version value from a protocol class version list based on the operational function, utilizing the protocol class version value of a request DSN frame when the DSN frame is a response DSN frame, retrieving the protocol class version value from a support protocol class version list, retrieving the protocol class version value from a unit-module protocol class version list, and extracting the protocol class version value from a negotiation result. For example, the processing module generates a protocol class version value of 03 based on retrieving the most recent protocol class version value from the support protocol class version list. As another example, processing module initiates a negotiation sequence when a protocol class error message is received (e.g., indicating that a present protocol class value and/or a present protocol class version value is unacceptable). Such a negotiation sequence includes one or more of generating a supported protocol class message, outputting the supported protocol class message, receiving a message that includes a supported protocol class list indicating supported protocol classes and/or protocol class versions, selecting at least one of a supported protocol class value and a protocol class version value from the supported protocol class list, and utilizing the at least one of the supported protocol class value and the supported protocol class version value.

The method continues at step 132 where the processing module generates an operation code field that includes an opcode value based on one or more of an operational function being communicated by the DSN frame, an opcode list, and a predetermination. For example, the processing module generates the operation code field to include an opcode value of 40 hex when the operational function being communicated by the DSN frame is a read request operation, the protocol class field value is 01, and the protocol class version field value is 03.

The method continues at step 134 where the processing module generates a request/response field to indicate a request message for a request message DSN frame or a response message for a response message DSN frame. For example, processing module generates the request/response field to include a value of zero when the DSN frame is the request message DSN frame. As another example, the processing module generates the request/response field to include a value of one when the DSN frame is the response message DSN frame.

The method continues at step 136 where the processing module generates a request number field that includes a request number value by at least one of transforming a random number generator output to produce the value, transforming a variable reference number to produce the value (e.g., a hash or block cipher encryption of the variable reference number which increments by one for each new request number value), adding an increment to a previous request number value to produce the value, selecting a predetermined number to produce the value, and utilizing a request number value of a request DSN frame when the DSN frame is a response DSN frame. For example, the processing module generates a request number value of 39,239 in a four byte wide request number field based on the random number generator output. As another example, the processing module generates a request number value of 9,093 when the previous request number value is 9,083 and the increment is 10. As yet another example, the processing module generates a request number value of 277 when the request number value of the request DSN frame is 277 and the DSN frame is a response DSN frame.

The method continues at step 138 where the processing module arranges, in order, the protocol class field, the protocol class version field, the opcode field, the request/response field, the request number field, and a payload length field to produce the protocol header. The method continues at step 140 where the processing module determines whether the DSN frame is to have a payload based on one or more values of one or more of the fields of the protocol header. For example, the processing module determines that the DSN frame is not to have the payload when the opcode value indicates a write commit response operation. As another example, the processing module determines that the DSN frame is to have the payload when the opcode value indicates a read request operation. The method branches to step 151 when the processing module determines that the DSN frame is not to have the payload. The method continues to step 142 when the processing module determines that the DSN frame is to have the payload.

At step 142, the processing module determines the payload as one of a request payload for a request message DSN frame and a response payload for a response message DSN frame. Such a determination may be based on one or more of the operational function, the values for the protocol class field, the protocol class version field, the request/response field, and the opcode field. The method to determine the payload is discussed in greater detail with reference to FIGS. 7A-26B.

The method continues at step 144 where the processing module sums a number of bytes of the payload to produce a value for the payload length field. Alternatively, the processing module determines the value utilizing one or more of a payload length formula and a fixed value. Such a determination may be based on one or more of the operational function, the values for the protocol class field, the protocol class version field, the request/response field, and the opcode field. For example, the processing module determines to utilize a payload length formula of 8T to produce the value as a four byte payload length field, where T is the number of transaction numbers, when the operational function is a write commit request operation. As another example, the processing module determines to utilize a fixed value of zero when the operational function is an undo write response operation. As yet another example, the processing module determines to sum number of bytes of the payload to produce the value as a four byte payload length field when the operational function is a checked write request operation.

The method continues at step 146 where the processing module appends the payload to the protocol header to produce the DSN frame. The method continues at step 148 where the processing module outputs the DSN frame. For example, the processing module sends a request message DSN frame to one or more DS unit for a write request operation. As another example, the processing module sends a response message DSN to a requesting device that initiated a write request.

The method continues at step 150 where the processing module establishes a value for the payload length field as a predetermined value. For example, processing module establishes the value as zero for the payload field when the DSN frame is not to have a payload. The method continues at step 152 where the processing module establishes the protocol header as the DSN frame. The method continues at step 148 where the processing module outputs the DSN frame.

FIG. 7A is a diagram illustrating an example of a read request message format as a request dispersed storage network (DSN) frame that includes a protocol header 112 and a payload 156. The protocol header 112 includes one or more of a protocol class field 116, a protocol class version field 118, an operation code field 120, a request/response field 122, a request number field 124, and a payload length field 126. For example, the operation code field 120 includes an operation code value of 40 hex and the request/response field 122 includes a value of zero when the request DSN frame is associated with the read request operational function.

The payload 114 includes a transaction number field 158 that includes a transaction number value and one or more slice name fields 1-n that include one or more slice names associated with the transaction number value. The transaction number field 158 may be utilized to associate two or more request/response DSN frames when a multistep sequence is utilized to accomplish a desired overall function. The transaction number value may be based on elapsed seconds since Jan. 1, 1970 UTC with nanosecond, millisecond, and/or seconds of precision when the operational function is to be completed in a transactional manner and may be set to zero when the operational function is to be completed in a non-transactional manner (e.g., one step or without regard to concurrent operational functions). For example, a read request DSN fame and a corresponding response DSN frame may each use the same an eight-byte value for the transaction number.

Each slice name of a slice name field 1-n is associated with one or more encoded data slices, which are to be read and returned in an associated read response operation. For example, to read encoded data slices 1 and 2, the payload 156 includes a transaction number 158 and two 48 bytes slice name fields that includes slice names 1 and slice name 2.

FIG. 7B is a flowchart illustrating an example of generating a read request message for a request dispersed storage network (DSN) frame to support a read request operation. The method begins at step 160 where a processing module generates values for fields of a protocol header. Step 160 includes steps 128-130 of FIG. 6D where the processing module generates a protocol class value for a protocol class field and generates a protocol class version value for a protocol class version field. Such generation of the fields of the protocol header includes generating the protocol class field to indicate a protocol class for the read request operation and generating the protocol class version field to indicate a protocol class version for the read request operation.

The method continues at step 162, which includes steps 132-134 of FIG. 6D, where the processing module generates an operation code field to indicate a read request operation (e.g., an operation code value of 40 hex) and generates a request/response value of zero for a request/response field. The method continues at step 136 of FIG. 6D where the processing module determines a request number value for a request number field.

The method continues at step 166 where the processing module generates a payload section of the read request DSN frame to include one or more slice name fields containing one or more slice names. The processing module may generate the one or more slice names based on information received in a previous read request, a list, a predetermination, a retrieval command, an error message, and/or a table lookup. For example, the processing module generates five slice names based on receiving a retrieval command that includes the five slice names to retrieve one or more encoded data slices associated with the five slice names.

The method continues at step 168 where the processing module generates a payload length field of the protocol header to include a payload length that represents a length of the payload section. Such generation of the payload length may include one or more of determining a length of a transaction number, determining a length for each of the one or more slices names, determining a number of slice names of the one or more slices names and generating the payload length for the payload length field based on the length of the transaction number, the length for each of the one or more slices names, and the number of slice names of the one or more slices names.

The method continues at step 170 where the processing module generates a transaction number field of the payload section to include a transaction number value corresponding to the read request operation. The method continues at step 172 where the processing module populates the protocol header and the payload to produce the read request message.

The method continues at step 174 where the processing module outputs the request DSN frame in order of the protocol header, the transaction number field, and the one or more slice name fields. Alternatively, or in addition to, the processing module generates a plurality of DSN frames regarding the read request operation, wherein the plurality of DSN frames includes the request DSN frame. In addition, the processing module may update a slice status table to indicate that the one or more slice names are associated with a read-lock status to prevent any further modifications of associated encoded data slices until steps associated with the read request operation are completed (e.g., encoded data slices are received in response to the read request message).

FIG. 8A is a diagram illustrating an example of a read response dispersed storage network (DSN) frame that includes a protocol header 112 and a payload 178. The protocol header 112 includes one or more of a protocol class field 116, a protocol class version field 118, an operation code field 120, a request/response field 122, a request number field 124, and a payload length field 126. For example, the operation code field 120 includes an operation code value of 40 hex and the request/response field 122 includes a value of one when the response DSN frame is associated with the read response operational function.

The payload 178 includes one or more slice payload sections 1-n that correspond to one or more slice names 1-n of an associated read request operational function (e.g., one or more slice names 1-n extracted from a read request DSN frame). Each slice payload section 1-n includes a slice revision count field 180, one or more slice revision numbering fields 1-r, one or more slice length fields 1-r, and one or more slice payload fields 1-r, where r represents a slice revision count value of the slice revision count field 180. The slice revision count value indicates a number of visible revisions of an associated slice name included in the slice payload section. For example, the slice revision count field is four bytes in length and includes a slice revision count value of 10 when 10 encoded data slices of 10 revisions are visible associated with the corresponding slice name. As another example, the slice revision count value is set to zero when there is no encoded data slice that is associated with the corresponding slice name (e.g., the slice may have been deleted).

Each slice revision numbering field 1-r includes a revision number of the associated slice name. For example, a slice revision numbering field is eight bytes in length and includes a revision number that is greater than other revision numbers of the slice name (e.g., most current revision of the slice). Each slice length field 1-r includes a length of a corresponding encoded data slice. For example, a slice length field value is set to 4,096 as a number of bytes of the corresponding encoded data slice. As another example, the slice length field value is set to zero when an encoded data slice of the revision of the corresponding slice name does not exist (e.g., the slice was deleted). Each slice payload field 1-r includes the corresponding encoded data slice. The slice payload field may be set to zero if the corresponding encoded data slice does not exist.

FIG. 8B is a flowchart illustrating an example of generating a read response message for a response dispersed storage network (DSN) frame to support a read response operation, which include similar steps to FIG. 6D. The method begins with step 182 where a processing module generates fields of a protocol header to include values of the fields of the protocol header. Step 182 includes steps 128-130 of FIG. 6D where the processing module generates a protocol class value for a protocol class field and generates a protocol class version value for a protocol class version field. Such generation of the fields of the protocol header includes generating the protocol class field to indicate a protocol class for the read response operation and generating the protocol class version field to indicate a protocol class version for the read response operation.

The method continues at step 184 that includes steps 132-134 of FIG. 6D where the processing module generates an operation code field to indicate a read response operation (e.g., an operation code value of 40 hex) and generates a request/response value of one for a request/response field. The method continues at step 136 of FIG. 6D where the processing module determines a request number value for a request number field by utilizing a request number value of a request DSN frame when the DSN frame is a response DSN frame (e.g., corresponding to the read response operation).

The method continues at step 188 where the processing module generates a payload of the response DSN frame regarding one or more slice names of a read response operation to include one or more slice payload sections, wherein generating a slice payload section of the one or more slice payload sections of a slice name of the one or more slice names includes generating a slice revision count field to indicate a number of revisions of the slice name included in the slice payload section and generating a slice revision numbering field for each of the revisions of the slice name to include a revision number. Such a slice revision count field may be set to zero when there are no revisions of the slice name (e.g., a deleted encoded data slice).

The method continues at step 190 where the processing module generates a slice length field for each of the revisions of the slice name to include a length of a corresponding encoded data slice and generates a slice payload field for each of the revisions of the slice name to include the corresponding encoded data slice. The method continues at step 192 where the processing module generates a payload length field of the protocol header to include a payload length that represents a length of the one or more slice payload sections. The method continues at step 194 where the processing module populates the protocol header and the payload to produce the read response message.

The method continues at step 196 where the processing module outputs the response DSN frame in order of the protocol header, and the one or more slice payload sections, wherein, within each slice payload section of the one or more slice payload sections, in an order of the slice revision count field, and for each of the revisions of the slice name, the slice revision numbering field, the slice length field, and the slice payload field. In addition, the processing module may establish an error condition based on one or more of the one or more slice names being associated with a locked encoded data slice state, a transaction number error (e.g., a slice name is locked by a second transaction number different from any transaction number associated with a corresponding read request message), the one or more slice names are associated with one or more encoded data slices that are not locally stored (e.g., a wrong DSN address), and a read request message is not authorized (e.g., a requester is not authorized to access such a portion of a DSN). The processing module discards the response DSN frame when the error condition is established.

Figure 9B:
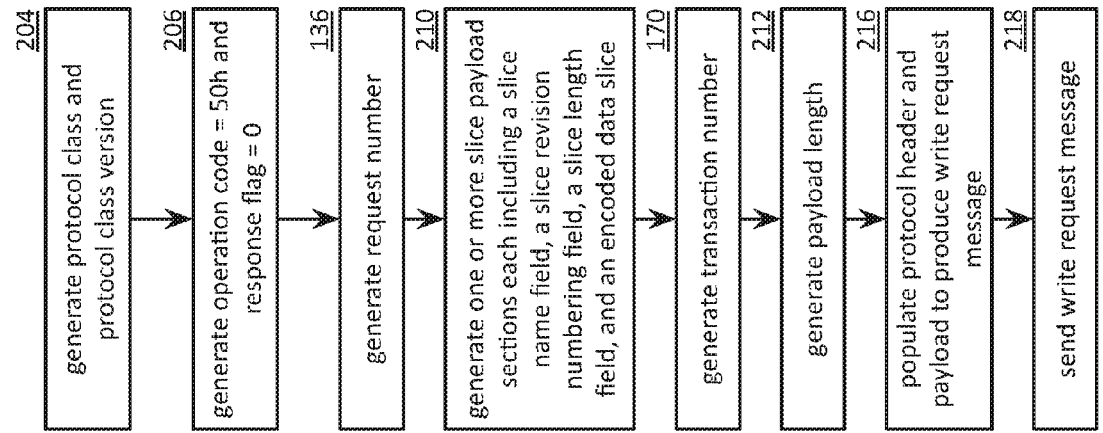
FIG. 9B is a flowchart illustrating an example of generating a write request message in accordance with the invention.
Figure 9A:
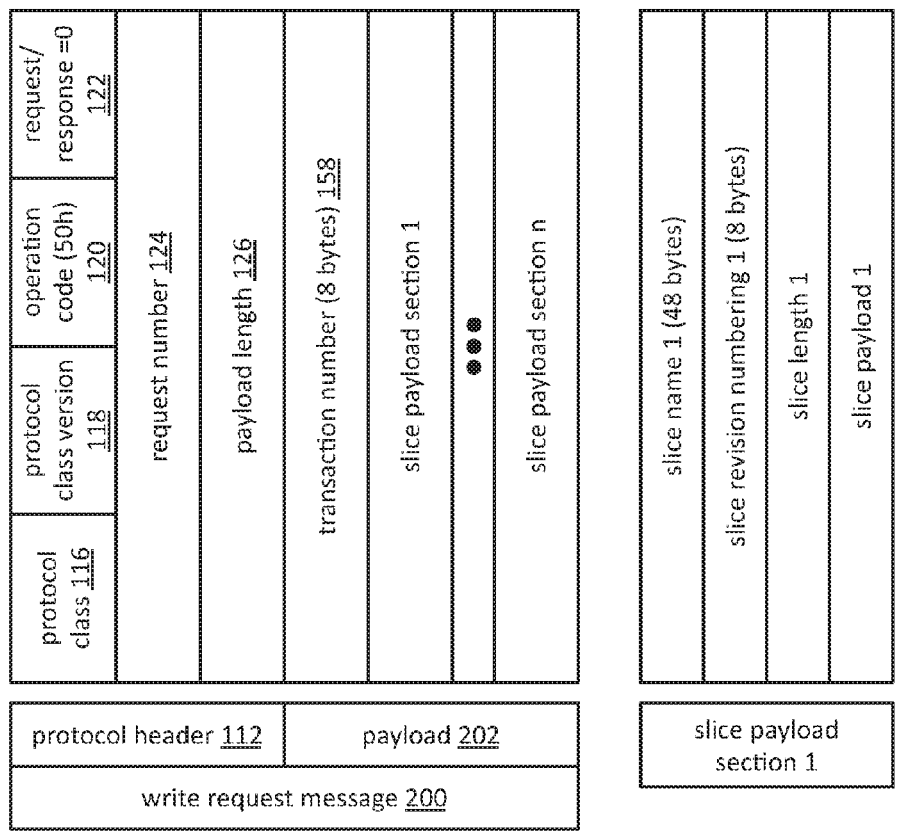
FIG. 9A is a diagram illustrating an example of a write request message format in accordance with the invention.

FIG. 9A is a diagram illustrating an example of a write request dispersed storage network (DSN) frame 200 that includes a protocol header 112 and a payload 202. The protocol header 112 includes one or more of a protocol class field 116, a protocol class version field 118, an operation code field 120, a request/response field 122, a request number field 124, and a payload length field 126. For example, the operation code field 120 includes an operation code value of 50 hex and the request/response field 122 includes a value of zero when the request DSN frame corresponds to an associated write request operational function.

The payload 202 includes a transaction number field 158 and one or more slice payload sections 1-n associated with the transaction number. Each slice payload section 1-n corresponds to a slice name 1-n of the associated write request operational function and includes a slice name field, a slice revision numbering field, a slice length field, and a slice payload field. For example, a slice payload section 1 includes slice name field 1, slice revision numbering field 1, slice length field 1, and slice payload field 1, and a slice payload section 2 includes slice name field 2, slice revision numbering field 2, slice length field 2, slice payload field 2 when two slice names are associated with the write request operational function (e.g., two encoded data slices to write).

The slice name field includes a slice name 1-n of the associated write request operational function. The slice revision numbering field includes a revision number of a corresponding encoded data slice of the slice name. The slice length field includes a length of the corresponding encoded data slice when the corresponding encoded data slice is to be stored. The slice length field includes a value of zero when the corresponding encoded data slice is to be deleted (e.g., the corresponding encoded data slice is a previously stored encoded data slice). The slice payload field includes the corresponding encoded data slice when the corresponding encoded data slice is to be stored.

FIG. 9B is a flowchart illustrating an example of generating a write request message for a dispersed storage network (DSN) frame to support a write request operation, which include similar steps to FIGS. 6D and 7B. The method begins with step 204 where a processing module generates fields of a protocol header to include values of the fields of the protocol header. Step 204 includes steps 128-130 of FIG. 6D where the processing module generates a protocol class value for a protocol class field and generates a protocol class version value for a protocol class version field. Such generation of the fields of the protocol header includes generating the protocol class field to indicate a protocol class for the write request operation and generating the protocol class version field to indicate a protocol class version for the write request operation.

The method continues at step 206 that includes steps 132-134 of FIG. 6D where the processing module generates an operation code field to indicate the write request operation (e.g., an operation code value of 50 hex) and generates a request/response value of zero for a request/response field (e.g., indicating a request message). The method continues at step 136 of FIG. 6D where the processing module determines a request number value for a request number field.

The method continues at step 210 where the processing module generates one or more payload sections of the request DSN frame regarding the write request operation. Such generation of a slice payload section of the one or more slice payload sections includes generating a slice name field to include a slice name of one or more slice names corresponding to an encoded data slice of one or more encoded data slices, generating a slice revision numbering field to include a revision number of the slice name, generating a slice length field to include a length of the encoded data slice, and generating a slice payload field to include the encoded data slice.

The method continues at step 170 of FIG. 7B where the processing module determines a transaction number field of the payload to include a transaction number corresponding to the write request operation. The method continues at step 212 where the processing module generates a payload length field of the protocol header to include a payload length that represents length of the transaction number field and length of the one or more slice payload sections. Such a length of a slice payload section of the one or more slice payload sections includes a length of the slice name field, a length of the slice revision numbering field, a length of the slice length field, and a length of the slice payload field.

The method continues at step 216 where the processing module populates the protocol header and the payload to produce the write request message. The method continues at step 218 where the processing module outputs the request DSN frame in order of the protocol header, the transaction number field, and the one or more slice payload sections. Alternatively, or in addition to, the processing module generates a plurality of DSN frames regarding the write request operation, wherein the plurality of DSN frames includes the request DSN frame. In addition, the processing module may update a slice status table to indicate that the one or more slice names are associated with a write-lock status to prevent any modifications of the associated encoded data slices until steps associated with the write request operation are completed (e.g., a favorable number of write commit response messages have been received associated with the write request operation).

FIG. 10A is a diagram illustrating an example of a write response dispersed storage network (DSN) frame 220 that includes a protocol header 112 and a payload 222. The protocol header 112 includes one or more of a protocol class field 116, a protocol class version field 118, an operation code field 120, a request/response field 122, a request number field 124, and a payload length field 126. For example, the operation code field 120 includes an operation code value of 50 hex and the request/response field 122 includes a value of one when the response DSN frame is associated with the write response operational function.

The payload 222 includes one or more status fields 1-n, wherein each status field of the one or more status fields 1-n includes a status code regarding storing of an encoded data slice associated with a slice name of one or more slice names (e.g., n slice names) of the write response operation. The write response message 220 may be generated in response to receiving a write request message. For example, status field 1 corresponds to a slice name 1 of the write request message, status field 2 corresponds to slice name 2 of the write request message, etc. The status code may be generated in accordance with a write response status code format, wherein the write response status code format indicates a disposition of the storing of the encoded data slice.

FIG. 10B is a table illustrating an example of a write response status code format table that includes a write response status code format description field 224 and a status code field 226. The write response status code format description field 224 includes one or more dispositions of storing of an encoded data slice and the status code field 226 includes one or more corresponding status codes. Such a status code of the one or more corresponding status codes is included in an associated status field of a write response message. In an example of operation, a processing module associated with a dispersed storage (DS) unit receives a write request message from a requester, determines a disposition of storing an encoded data slice associated with the write request message, matches the disposition to an entry of the write response status code format description field 224, generates a write response message that includes a corresponding status code of the status code field 226, and sends the write response message to the requester.

In an instance of generating a status code, a status code of 00 hex is generated when a write sequence associated with the encoded data slice succeeded with no errors. In another instance, a status code of 01 hex is generated when the encoded data slice is associated with a locked status by another transaction (e.g., a transaction conflict wherein a transaction number received in a write request message does not match a transaction number associated with a pending operation that invoked the locked status). In another instance, a status code of 02 hex is generated when a slice name associated with the encoded data slice is not associated with an assigned slice name range (e.g., an addressing error). In another instance, a status code of 04 hex is generated when the write request message is unauthorized.

FIG. 10C is a flowchart illustrating an example of generating a write response message for a response dispersed storage network (DSN) frame to support a write response operation, which include similar steps to FIG. 6D. The method begins at step 228 where a processing module generates fields of a protocol header to include values of the fields of the protocol header. Step 228 includes steps 128-130 of FIG. 6D where the processing module generates a protocol class value for a protocol class field and generates a protocol class version value for a protocol class version field. Such generation of the fields of the protocol header includes generating the protocol class field to indicate a protocol class for the write response operation and generating the protocol class version field to indicate a protocol class version for the write response operation.

The method continues at step 230 that includes steps 132-134 of FIG. 6D where the processing module generates an operation code field to indicate a write response operation (e.g., an operation code value of 50 hex) and generates a request/response value of one for a request/response field to indicate a response message. The method continues at step 136 of FIG. 6D where the processing module determines a request number value for a request number field.

The method continues at step 234 where the processing module generates a payload of the response DSN frame regarding one or more slice names of the write response operation to include one or more status fields, wherein generating a status field of the one or more status fields to indicate a status code regarding storing of an encoded data slice associated with a slice name of the one or more slice names. Such a status code includes one of an indication that the encoded data slice was successful stored, an indication of a transaction conflict, an indication of an addressing error, an indication that a corresponding write request message is unauthorized and an indication that the encoded data slice was not stored.

The method continues at step 236 where the processing module generates a payload length field of the protocol header to include a payload length that represents a length of the one or more status fields. For example, the processing module generates the payload length field to include a payload length of five when a length each of the one or more status fields is one byte each and there are five status codes included in the payload of the response DSN frame. The method continues at step 238 where the processing module populates the protocol header and the payload to produce the write response message. The method continues at step 240 where the processing module outputs the response DSN frame in order of the protocol header and the one or more status fields, wherein the order of the one or more status fields corresponds to an order of slice names of the corresponding write request message.

FIG. 11A is a diagram of an example of a checked write request dispersed storage network (DSN) frame 242 that includes a protocol header 112 and a payload 244. The protocol header 112 includes one or more of a protocol class field 116, a protocol class version field 118, an operation code field 120, a request/response field 122, a request number field 124, and a payload length field 126. For example, the operation code field 120 includes an operation code value of 51 hex and the request/response field 122 includes a value of zero when the request DSN frame corresponds to the checked write request operational function.

The payload 244 includes a transaction number field 158 and one or more slice payload sections 1-n associated with a transaction number value of the transaction number field 158. Such one or more slice payload sections 1-n correspond to one or more slice names 1-n of the associated checked write request operational function. Each slice payload section of the one or more slice payload sections 1-n includes a slice name field, a last known slice revision numbering field, a new slice revision numbering field, a slice length field, and a slice payload field. For example, a slice payload section 1 includes slice name field 1, last known slice revision numbering field 1, new slice revision numbering field 1, slice length field 1, and slice payload field 1, and a slice payload section 2 includes slice name field 2, last known slice revision numbering field 2, new slice revision numbering field 2, slice length field 2, slice payload field 2 when two slice names are associated with the checked write request operational function (e.g., two encoded data slices to write).

Each of the slice name field includes a slice name 1-n of the associated checked write request operational function. The last known slice revision numbering field includes a last known revision number of a previously stored encoded data slice of the slice name. The new slice revision numbering field includes a new revision number of a corresponding encoded data slice (e.g., in the payload of the checked write request message) of the slice name. The slice length field includes a length of the corresponding encoded data slice when the corresponding encoded data slice is to be stored. The slice length field includes a value of zero when the previously stored encoded data slice is to be deleted. The slice payload field includes the corresponding encoded data slice when the corresponding encoded data slice is to be stored.

FIG. 11B is a flowchart illustrating an example of generating a checked write request message for a request dispersed storage network (DSN) frame to support a checked write request operation, which include similar steps to FIGS. 6D and 7B. The method begins with step 246 where a processing module generates fields of a protocol header to include values of the fields of the protocol header. Step 246 includes steps 128-130 of FIG. 6D where the processing module generates a protocol class value for a protocol class field and generates a protocol class version value for a protocol class version field. Such generation of the fields of the protocol header includes generating the protocol class field to indicate a protocol class for the checked write request operation and generating the protocol class version field to indicate a protocol class version for the write request operation.

The method continues at step 248 that includes steps 132-134 of FIG. 6D where the processing module generates an operation code field to indicate the checked write request operation (e.g., an operation code value of 51 hex) and generates a request/response value of zero for a request/response field (e.g., indicating a request message). The method continues at step 136 of FIG. 6D where the processing module determines a request number value for a request number field.

The method continues at step 252 where the processing module generates one or more payload sections of the request DSN frame regarding the checked write request operation. The generation of a slice payload section includes generating a slice name field to include a slice name of one or more slice names corresponding to an encoded data slice, generating a last known slice revision numbering field to include a last known revision number of the slice name, generating a new slice revision numbering field to include a new revision number of the slice name corresponding to the checked write request operation, generating a slice length field to include a length of the encoded data slice, and generating a slice payload field to include the encoded data slice.

The generation of the last known revision number includes selecting the last known revision number from a revision number list (e.g., select a most recent revision from a local directory cache), extracting the last known slice revision number from a check response message (e.g., a query response of the most recent revision number), and/or extracting the last known slice revision number from a read response message (e.g., the most recent revision number). The method continues at step 170 of FIG. 7B where the processing module determines a transaction number field of the payload to include a transaction number corresponding to the checked write request operation.

The method continues at step 256 where the processing module generates a payload length field of the protocol header to include a payload length that represents length of the transaction number field and length of the one or more slice payload sections. The length of a slice payload section includes a length of the slice name field, a length of the last known slice revision numbering field, a length of the new slice revision numbering field, a length of the slice length field, and a length of the slice payload field.

The method continues at step 258 where the processing module populates the protocol header and the payload to produce the write request message. The method continues at step 260 where the processing module outputs the request DSN frame in order of the protocol header, the transaction number field, and the one or more slice payload sections. Alternatively, or in addition to, the processing module generates a plurality of DSN frames regarding the checked write request operation, wherein the plurality of DSN frames includes the request DSN frame. In addition, the processing module may update a slice status table to indicate that the one or more slice names are associated with a write-lock status to prevent any modifications of the associated encoded data slices until steps associated with the write request operation are completed (e.g., a favorable number of write commit response messages have been received associated with the write request operation).

FIG. 12A is a diagram of an example of a checked write response dispersed storage network (DSN) frame 262 that includes a protocol header 112 and a payload 264. The protocol header 112 includes one or more of a protocol class field 116, a protocol class version field 118, an operation code field 120, a request/response field 122, a request number field 124, and a payload length field 126. For example, the operation code field 120 includes an operation code value of 51 hex and the request/response field 122 includes a value of one when the response DSN frame is associated with the checked write response operational function.

The payload 264 includes one or more status fields 1-n, wherein each status field includes a status code regarding storing of an encoded data slice associated with a slice name of one or more slice names (e.g., n slice names). For example, status field 1 corresponds to a slice name 1 of the checked write request message, status field 2 corresponds to slice name 2 of the checked write request message, etc. The status code may be generated in accordance with a checked write response status code format, which indicates a disposition of the storing of the encoded data slice.

FIG. 12B is a table illustrating an example of a checked write response status code format that includes a checked write response status code format description field 265 and a status code field 226. The checked write response status code format description field 265 includes one or more dispositions of storing of an encoded data slice and the status code field 226 includes one or more corresponding status codes. In an example of operation, a processing module associated with a dispersed storage (DS) unit receives a checked write request message from a requester, determines a disposition of storing an encoded data slice associated with the checked write request message, matches the disposition to an entry of the checked write response status code format description field 265, generates a checked write response message that includes a corresponding status code in the status code field 226, and sends the checked write response message to the requester.

In an instance of generating a status code, a status code of 00 hex is generated when a checked write sequence associated with the encoded data slice succeeded with no errors. In another instance, a status code of 01 hex is generated when the encoded data slice is associated with a locked status by another transaction (e.g., a transaction conflict wherein a transaction number received in a checked write request message does not match a transaction number associated with a pending operation that invoked the locked status). In a further instance, a status code of 02 hex is generated when a slice name associated with the encoded data slice is not associated with an assigned slice name range (e.g., an addressing error). In yet another instance, a status code of 03 hex is generated when the slice name associated with the encoded data slice does not meet criteria for a checked operation (e.g., a last known revision of the slice name is not present). In still another instance, a status code of 04 hex is generated when the checked write request message is unauthorized.

FIG. 12C is a flowchart illustrating an example of generating a checked write response message for a response dispersed storage network (DSN) frame to support a checked write response operation, which include similar steps to FIGS. 6D and 10C. The method begins with step 268 where a processing module generates fields of a protocol header to include values of the fields of the protocol header. Step 268 includes steps 128-130 of FIG. 6D where the processing module generates a protocol class value for a protocol class field and generates a protocol class version value for a protocol class version field. The generation of the fields of the protocol header includes generating the protocol class field to indicate a protocol class for the checked write response operation and generating the protocol class version field to indicate a protocol class version for the checked write response operation.

The method continues at step 270, which includes steps 132-134 of FIG. 6D, where the processing module generates an operation code field to indicate a write response operation (e.g., an operation code value of 51 hex) and generates a request/response value of one for a request/response field to indicate a response message. The method continues at step 136 of FIG. 6D where the processing module determines a request number value for a request number field.

The method continues at step 274 where the processing module generates a payload of the response DSN frame regarding one or more slice names of the checked write response operation to include one or more status fields, wherein generating a status field of the one or more status fields to indicate a status code regarding storing of an encoded data slice associated with a slice name of the one or more slice names. A status code includes an indication that the encoded data slice was successful stored, a transaction conflict, an addressing error, a revision check error (e.g., a last known revision number received in a checked write request message is not substantially the same as a latest revision number of the slice name), a corresponding write request message is unauthorized, and/or the encoded data slice was not stored.

The method continues with step 236 of FIG. 10C where the processing module generates a payload length field of the protocol header to include a payload length that represents a length of the one or more status fields. The method continues at step 278 where the processing module populates the protocol header and the payload to produce the checked write response message. The method continues at step 280 where the processing module outputs the response DSN frame in order of the protocol header and the one or more status fields, wherein the order of the one or more status fields corresponds to an order of slice names of the corresponding checked write request message.

Figure 13B:
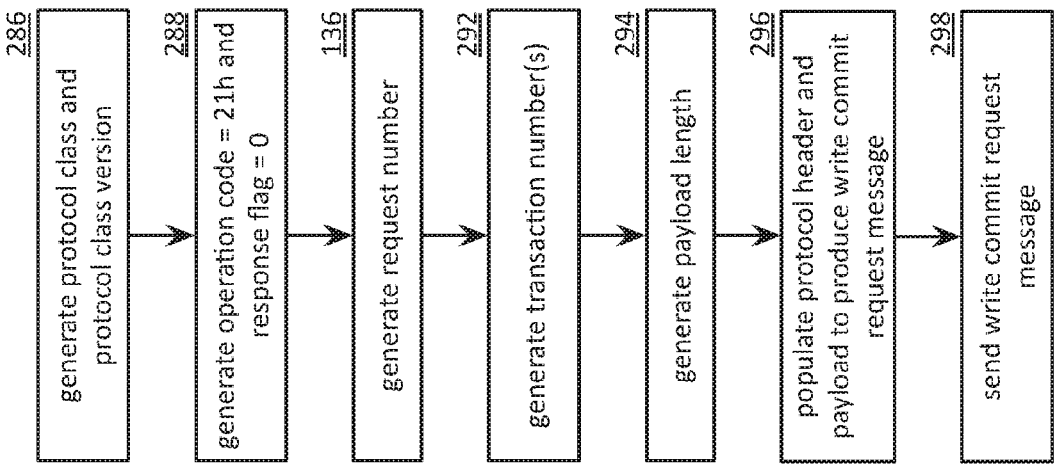
FIG. 13B is a flowchart illustrating an example of generating a write commit request message in accordance with the invention.
Figure 13A:
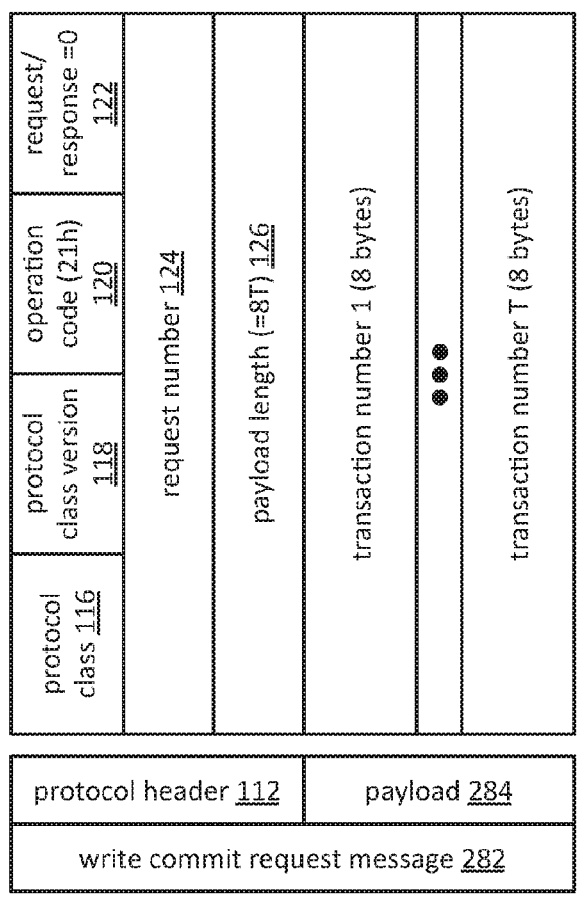
FIG. 13A is a diagram illustrating an example of a write commit request message format in accordance with the invention.

FIG. 13A is a diagram illustrating an example of a write commit request DSN frame 282 that protocol header 112 and a payload 284. The write commit request is one of an intermediate write request operations that is generated subsequent to the generation of a write request operation or a checked write request operation and precedes the generation of a conclusive write request operation (e.g., a finalize write request operational function, an undo write request operational function). The protocol header 112 includes one or more of a protocol class field 116, a protocol class version field 118, an operation code field 120, a request/response field 122, a request number field 124, and a payload length field 126. For example, the operation code field 120 includes an operation code value of 21 hex and the request/response field 122 includes a value of zero when the request DSN frame corresponds to the write commit request operational function.

The payload 284 includes one or more transaction number fields 1-T that includes one or more transaction numbers corresponding to the write request operation (e.g., the write request operation that precedes the write commit request operation). For example, the payload 284 includes 2 transaction number fields, where the first transaction number field includes a transaction number of 314 for the write operation and the second transaction number field includes a transaction number of 647 for the write commit operation.

FIG. 13B is a flowchart illustrating an example of generating a write commit request DSN frame, which includes similar steps to FIG. 6D. The method begins at step 286 where a processing module generates fields of a protocol header to include values of the fields of the protocol header. Step 286 includes steps 128-130 of FIG. 6D where the processing module generates a protocol class value for a protocol class field and generates a protocol class version value for a protocol class version field. The generation of the fields of the protocol header includes generating the protocol class field to indicate a protocol class for the write commit request operation and generating the protocol class version field to indicate a protocol class version for the write commit request operation.

The method continues at step 288 that includes steps 132-134 of FIG. 6D where the processing module generates an operation code field to indicate a write commit request operation (e.g., an operation code value of 21 hex) and generates a request/response value of zero for a request/response field (e.g., indicating a request message). The method continues at step 136 of FIG. 6D where the processing module determines a request number value for a request number field.

The method continues at step 292 where the processing module generates a payload of the request DSN frame by generating one or more transaction number fields to include one or more transaction numbers corresponding to a write request operation. The generation of a transaction number includes receiving the transaction number (e.g., included in a command) and/or selecting the transaction number from a transaction number list (e.g., the transaction number list includes transaction numbers associated with the write request operation). For example, processing module selects the transaction number from the transaction number list when the one or more transaction numbers are associated one or more successful write request operations (e.g., favorable write response messages were received corresponding to a write threshold number of encoded data slices per data segment associated with the one or more transaction numbers).

The method continues at step 294 where the processing module generates a protocol header of the request DSN frame by generating a payload length field to include a payload length that represents a length of the one or more transaction number fields. For example, the processing module generates the payload length field to include a payload length of twenty-four when a length of each of three transaction number fields is eight bytes. The method continues at step 296 where the processing module populates the protocol header and the payload to produce the write commit request message. The method continues at step 298 where the processing module outputs the request DSN frame in order of the protocol header and the one or more transaction number fields. Alternatively, or in addition to, the processing module generates a plurality of DSN frames regarding the intermediate write request operation, wherein the plurality of DSN frames includes the request DSN frame.

Figure 14B:
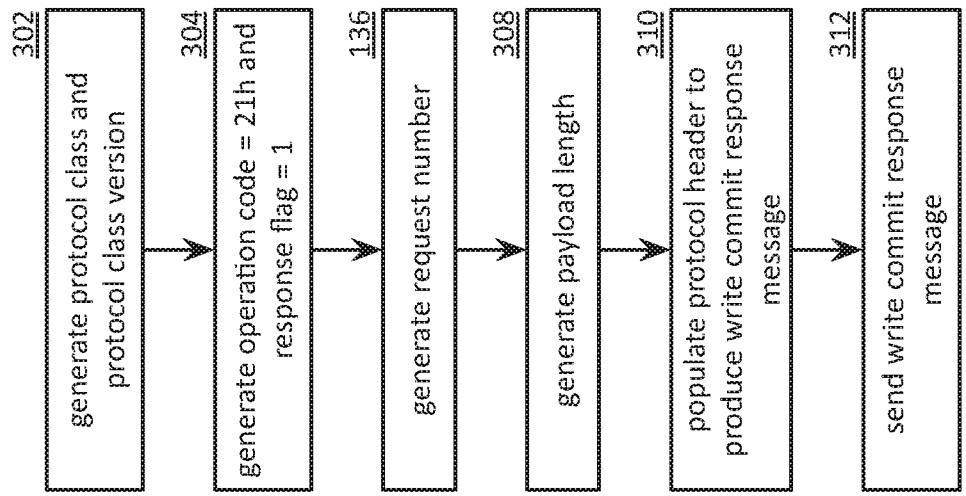
FIG. 14B is a flowchart illustrating an example of generating a write commit response message in accordance with the invention.
Figure 14A:
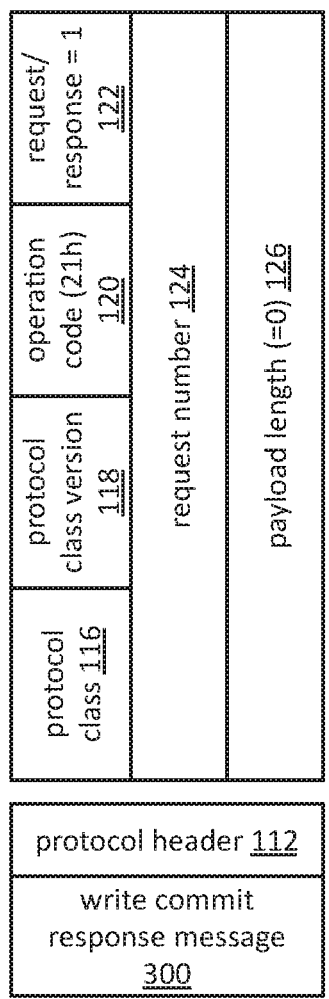
FIG. 14A is a diagram illustrating an example of a write commit response message format in accordance with the invention.

FIG. 14A is a diagram illustrating an example of a write commit response DSN frame 300 that includes a protocol header 112. The write commit response is one of an intermediate write response operations that is generated subsequent to the generation of a write request response or a checked write response operation and precedes the generation of a conclusive write response operation.

The protocol header 112 includes one or more of a protocol class field 116, a protocol class version field 118, an operation code field 120, a request/response field 122, a request number field 124, and a payload length field 126. For example, the operation code field 120 includes an operation code value of 21 hex, the request/response field 122 includes a value of one, the request number field 124 includes a request number extracted from an associated write commit request message, and the payload length field 126 includes a value of zero when the response DSN frame is associated with the write commit response operational function.

In an operational example, the write commit response message 300 is generated and outputted in response to receiving and processing an associated write commit request message when all transactions associated with the write commit request message are successfully committed (e.g., a slice status table is updated to indicate that one or more slice names are associated with visible encode data slices, wherein the one or more slice names are associated with a transaction number of the write commit request message).

FIG. 14B is a flowchart illustrating an example of generating a write commit response DSN frame, which includes similar steps to FIG. 6D. The method begins at step 302, which includes steps 128-130 of FIG. 6D, where the processing module generates a protocol class value for a protocol class field and generates a protocol class version value for a protocol class version field. The generation of the fields of the protocol header includes generating the protocol class field to indicate a protocol class for the intermediate write response operation (e.g., the write commit response operation) and generating the protocol class version field to indicate a protocol class version for the intermediate write response operation.

The method continues at step 304, which includes steps 132-134 of FIG. 6D, where the processing module generates an operation code field to indicate the intermediate write response operation (e.g., the write commit request operation associated with an operation code value of 21 hex) and the processing module generates a request/response value of one for a request/response field (e.g., indicating a response message). The method continues with step 136 of FIG. 6D, where the processing module determines a request number value for a request number field. For example, the processing module determines the request number by extracting a request number from a message of an associated intermediate write request operation. For instance, processing module determines the request number by extracting a request number from an associated write commit request message.

The method continues at step 308 where the processing module generates a payload length field of the protocol header to include a predetermined payload length value. For example, processing module generates the payload length field to include a payload length of zero when the payload length field is associated with the intermediate write response message. The method continues at step 310 where the processing module populates the protocol header to produce the write commit response message. The method continues at step 312 where the processing module outputs in order, the protocol class field, the protocol class version field, the operation code field, the request/response field, the request number field, and the payload length field as the response DSN frame of the write commit response message.

FIG. 15A is a diagram illustrating an example of a write rollback request DSN frame 314, which is another intermediate write request operation. The write rollback request frame 314 includes a protocol header 112 and a payload 316. The protocol header 112 includes a protocol class field 116, a protocol class version field 118, an operation code field 120, a request/response field 122, a request number field 124, and/or a payload length field 126. For example, the operation code field 120 includes an operation code value of 22 hex and the request/response field 122 includes a value of zero when the request DSN frame corresponds to the write rollback request operational function.

The payload 316 includes one or more transaction number fields 1-T that include one or more transaction numbers corresponding to a write request operation. For example, the payload 316 includes a transaction number field 1, wherein the transaction number field 1 includes a transaction number of 647 when a write rollback request operational function is active for encoded data slices associated with the transaction number 647.

FIG. 15B is a flowchart illustrating an example of generating a write rollback request message for a request dispersed storage network (DSN) frame, which includes similar steps to FIGS. 6D and 13B. The method begins at step 318 where a processing module generates fields of a protocol header to include values therein. Step 318 includes steps 128-130 of FIG. 6D where the processing module generates a protocol class value for a protocol class field and generates a protocol class version value for a protocol class version field. The generation of the fields of the protocol header includes generating the protocol class field to indicate a protocol class for the write rollback request operation and generating the protocol class version field to indicate a protocol class version for the write rollback request operation.

The method continues at step 320, which includes steps 132-134 of FIG. 6D, where the processing module generates an operation code field to indicate a write rollback request operation (e.g., an operation code value of 22 hex) and generates a request/response value of zero for a request/response field (e.g., indicating a request message). The method continues at step 136 of FIG. 6D where the processing module determines a request number value for a request number field.

The method continues at step 324 where the processing module generates a payload of the request DSN frame regarding the intermediate write request operation by generating one or more transaction number fields of the payload to include one or more transaction numbers corresponding to a write request operation. The method continues at step 294 of FIG. 13B where the processing module generates a protocol header of the request DSN frame by generating a payload length field of the protocol header to include a payload length that represents a length of the one or more transaction number fields.

The method continues at step 328 where the processing module populates the protocol header and the payload to produce the write rollback request message. The method continues at step 330 where the processing module outputs the request DSN frame in order of the protocol header and the one or more transaction number fields. Alternatively, or in addition to, the processing module generates a plurality of DSN frames regarding the intermediate write request operation, wherein the plurality of DSN frames includes the request DSN frame. Alternatively, or in addition to, the processing module updates a slice status table to indicate that associated encoded data slices (e.g., of the write request operation) are associated with a write-lock status at a rollback stage to prevent any further modifications of the encoded slices until the write rollback request operation concludes (e.g., a corresponding write rollback response message is received).

FIG. 16A is a diagram illustrating an example of a write rollback response DSN frame, which is another intermediate write response operation. The response DSN frame 332 includes a protocol header 112, which includes one or more of a protocol class field 116, a protocol class version field 118, an operation code field 120, a request/response field 122, a request number field 124, and a payload length field 126. For example, the operation code field 120 includes an operation code value of 22 hex, the request/response field 122 includes a value of one, the request number field 124 includes a request number extracted from an associated write rollback request message, and the payload length field 126 includes a value of zero when the response DSN frame is associated with the write rollback response operational function.

In an operational example, the write rollback response message 332 is generated and outputted in response to receiving and processing an associated write rollback request message when the transactions associated with the write rollback request message are successfully rolled back. For example, encoded data slices associated with a transaction number of a write rollback request message are deleted.

FIG. 16B is a flowchart illustrating an example of generating a write rollback response DSN frame, which includes similar steps to FIGS. 6D and 14B. The method begins with step 334 where a processing module generates fields of a protocol header to include values of the fields of the protocol header. Step 334 includes steps 128-130 of FIG. 6D where the processing module generates a protocol class value for a protocol class field and generates a protocol class version value for a protocol class version field. Such generation of the fields of the protocol header includes generating the protocol class field to indicate a protocol class for the intermediate write response operation (e.g., the write rollback response operation) and generating the protocol class version field to indicate a protocol class version for the intermediate write response operation.

The method continues at step 336 that includes steps 132-134 of FIG. 6D where the processing module generates an operation code field to indicate the intermediate write response operation (e.g., the write rollback response operation associated with an operation code value of 22 hex) and the processing module generates a request/response value of one for a request/response field (e.g., indicating a response message). The method continues with step 136 of FIG. 6D, where the processing module determines a request number value for a request number field (e.g., the processing module determines the request number by extracting a request number from an associated write rollback request message).

The method continues with step 308 of FIG. 14B where the processing module generates a payload length field of the protocol header to include a predetermined payload length value (e.g., zero for the intermediate write response message). The method continues at step 342 where the processing module populates the protocol header to produce the write rollback response message. The method continues at step 344 where the processing module outputs in order, the protocol class field, the protocol class version field, the operation code field, the request/response field, the request number field, and the payload length field as the response DSN frame of the write rollback response message. Alternatively, or in addition to, the processing module may delete one or more encoded data slices associated with the one or more transaction numbers of the slice upon receiving the associated write rollback request message.

Figure 17B:
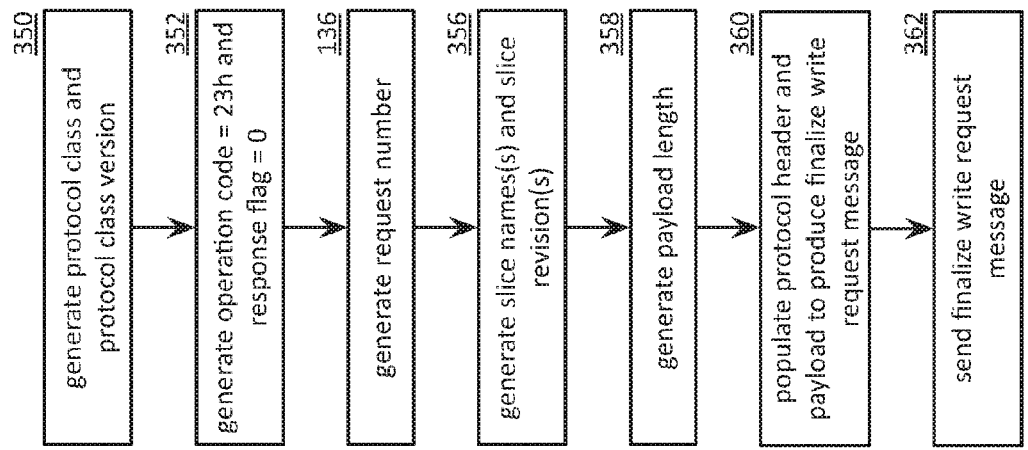
FIG. 17B is a flowchart illustrating an example of generating a finalize write request message in accordance with the invention.
Figure 17A:
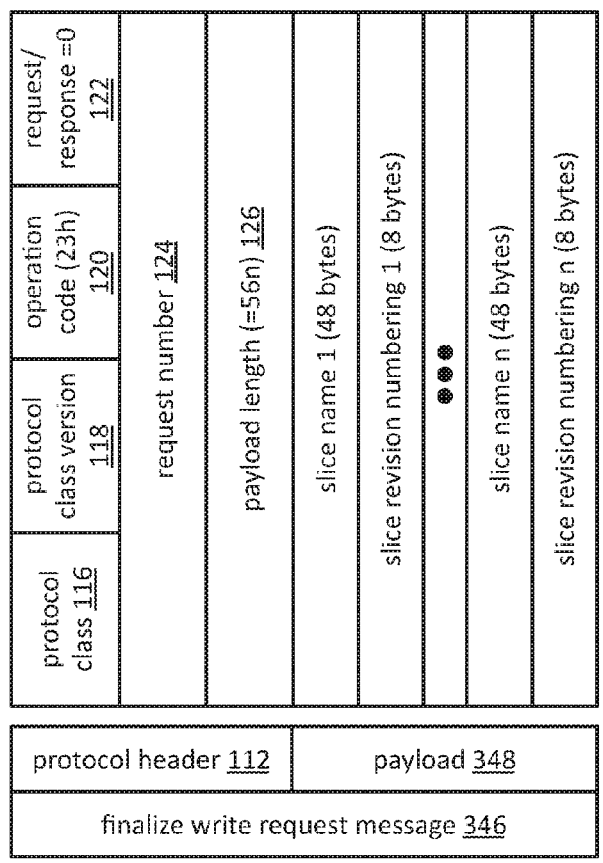
FIG. 17A is a diagram illustrating an example of a finalize write request message format in accordance with the invention.

FIG. 17A is a diagram illustrating an example of a DSN frame 346 for finalize write request, which is one of conclusive write request operations. The request DSN frame 346 includes a protocol header 112 and a payload 348. The protocol header 112 includes one or more of a protocol class field 116, a protocol class version field 118, an operation code field 120, a request/response field 122, a request number field 124, and a payload length field 126. For example, the operation code field 120 includes an operation code value of 23 hex and the request/response field 122 includes a value of zero when the request DSN frame corresponds to the finalize write request operational function. The payload 348 includes one or more slice name fields 1-n, each of which includes a slice name, and one or more slice revision numbering fields 1-n, each of which includes a slice revision number.

FIG. 17B is a flowchart illustrating an example of generating a finalize write request DSN frame, which includes similar steps to FIG. 6D. The method begins at step 350 where a processing module generates fields of a protocol header to include corresponding values. Step 350 includes steps 128-130 of FIG. 6D where, when a threshold number of write commit responses have been received, the processing module generates a protocol class value for a protocol class field and generates a protocol class version value for a protocol class version field. The protocol class field value indicates a protocol class of the finalize write request operation and the protocol class version value indicate a protocol class version for the finalize write request operation.

The method continues at step 352, which includes steps 132-134 of FIG. 6D, where the processing module generates an operation code field to indicate a finalize write request operation (e.g., an operation code value of 23 hex) and generates a request/response value of zero for a request/response field (e.g., indicating a request message) when the threshold number of the one or more write commit responses have been received. The method continues at step 136 of FIG. 6D where the processing module determines a request number value for a request number field.

The method continues at step 356 where the processing module generates a payload of the request DSN frame to include one or more slice name fields. A slice name field includes a slice name corresponding to a write commit response of a write request operation.

The method continues at step 358 where the processing module generates a payload length field of the protocol header to include a payload length that represents length of the slice name fields and length the slice revision numbering fields. The method continues at step 360 where the processing module populates the protocol header and the payload to produce the finalize write request message.

The method continues at step 362 where the processing module outputs the request DSN frame that includes the finalize write request message in order of the protocol header and one or more slice field pairs, wherein each of the one or more slice field pairs includes, in order, a slice name field of the one or more slice name fields and a slice revision numbering field of the one or more slice revision numbering fields, wherein the slice revision numbering field is associated with the slice name field.

Alternatively, or in addition to, the processing module generates a plurality of DSN frames regarding the conclusive write request operation, wherein the plurality of DSN frames includes the request DSN frame. Alternatively, or in addition to, the processing module updates a slice status table to indicate that slice names of the payload of the finalize write request message are now not associated with a write-lock status since they are now a finalized status and hence a previous write request operational function has concluded (e.g., a write transaction has expired).

Figure 18B:
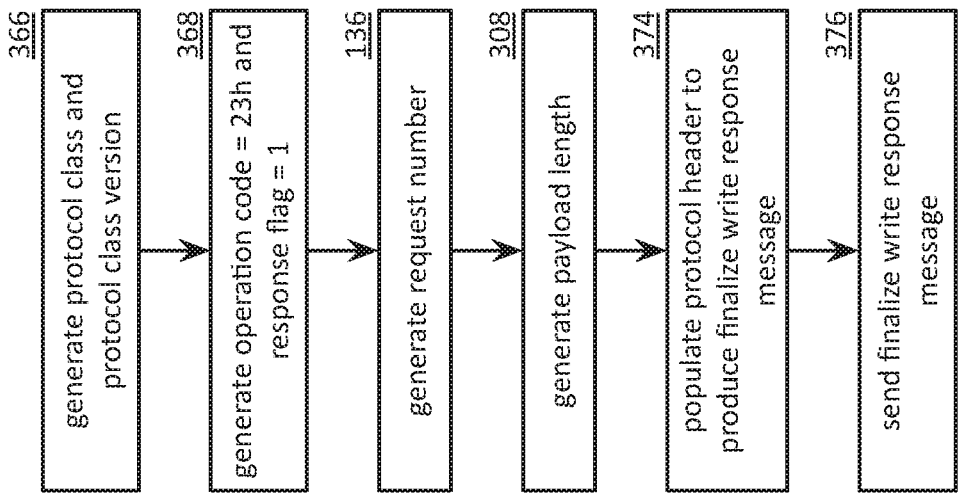
FIG. 18B is a flowchart illustrating an example of generating a finalize write response message in accordance with the invention.
Figure 18A:
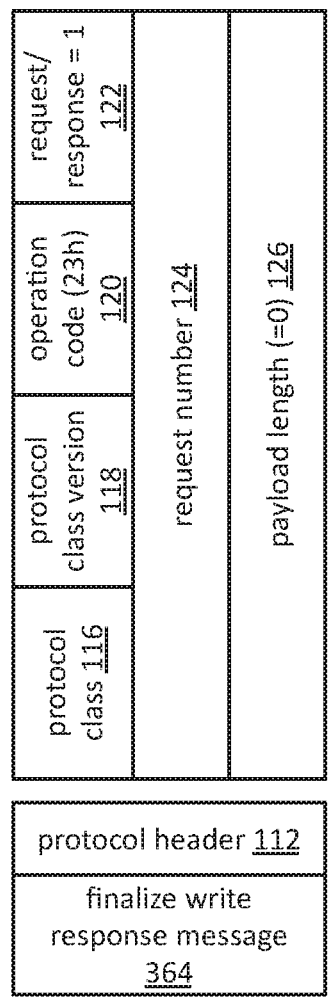
FIG. 18A is a diagram illustrating an example of a finalize write response message format in accordance with the invention.

FIG. 18A is a diagram illustrating an example of a DSN frame of finalize write response, which is one of conclusive write response operations. The finalize write response message 364 includes a protocol header 112, which includes one or more of a protocol class field 116, a protocol class version field 118, an operation code field 120, a request/response field 122, a request number field 124, and a payload length field 126. For example, the operation code field 120 includes an operation code value of 23 hex, the request/response field 122 includes a value of one, the request number field 124 includes a request number extracted from an associated finalize write request message, and the payload length field 126 includes a value of zero when the response DSN frame is associated with the finalize write response operational function.

In an operational example, the finalize write response message 364 is generated and outputted in response to receiving and processing an associated finalize write request message when encoded data slices corresponding to the finalize write request message are successfully finalized (e.g., a newest revision of an encoded data slice remains stored while encoded data slices of previous revisions are deleted).

FIG. 18B is a flowchart illustrating an example of generating a finalize write response DSN frame, which includes similar steps to FIGS. 6D and 14B. The method begins at step 366 where a processing module generates values for inclusion in fields of a protocol header. Step 366 includes steps 128-130 of FIG. 6D where the processing module generates a protocol class value for a protocol class field and generates a protocol class version value for a protocol class version field.

The method continues at step 368 that includes steps 132-134 of FIG. 6D where the processing module generates an operation code field to indicate the conclusive write response operation (e.g., the finalize write response operation associated with an operation code value of 23 hex) and the processing module generates a request/response value of one for a request/response field (e.g., indicating a response message). The generating of the operation code field includes indicating the finalize write response operation or by extracting an operational code from a corresponding conclusive write request message (e.g., from a finalize write request message). The method continues with step 136 of FIG. 6D, where the processing module determines a request number value associated with the conclusive write request operation (e.g., the processing module determines the request number by extracting a request number from the associated finalize write request message).

The method continues at step 308 of FIG. 14B where the processing module generates a payload length field of the protocol header to include a predetermined payload length value (e.g., zero for the conclusive write response message). The method continues at step 374 where the processing module populates the protocol header to produce the finalize write response message. The method continues at step 376 where the processing module outputs in order, the protocol class field, the protocol class version field, the operation code field, the request/response field, the request number field, and the payload length field as the response DSN frame of the finalize write response message. Alternatively, or in addition to, the processing module may delete one or more encoded data slices associated with all but the most recent revision of each slice name of an associated finalize write request message when the one or more encoded data slices are not associated with a locked status by the another open transaction.

Figure 19B:
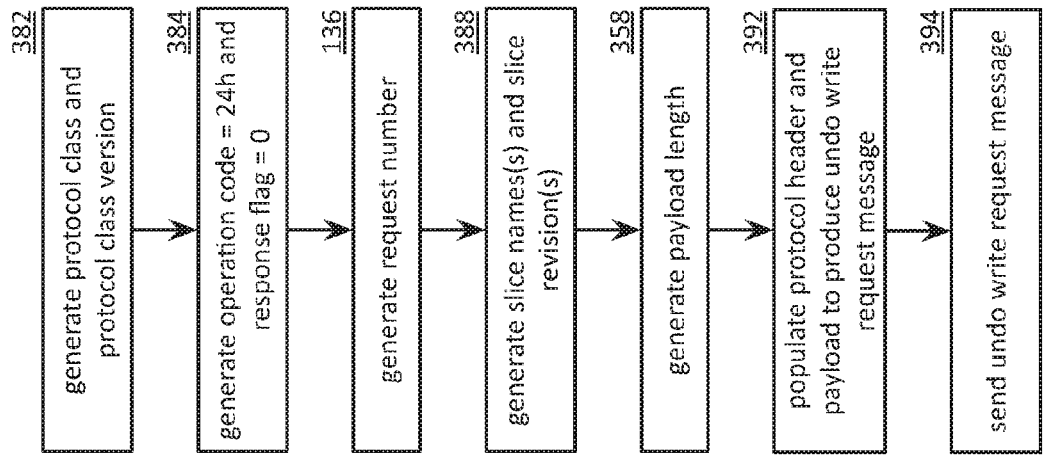
FIG. 19B is a flowchart illustrating an example of generating an undo write request message in accordance with the invention.
Figure 19A:
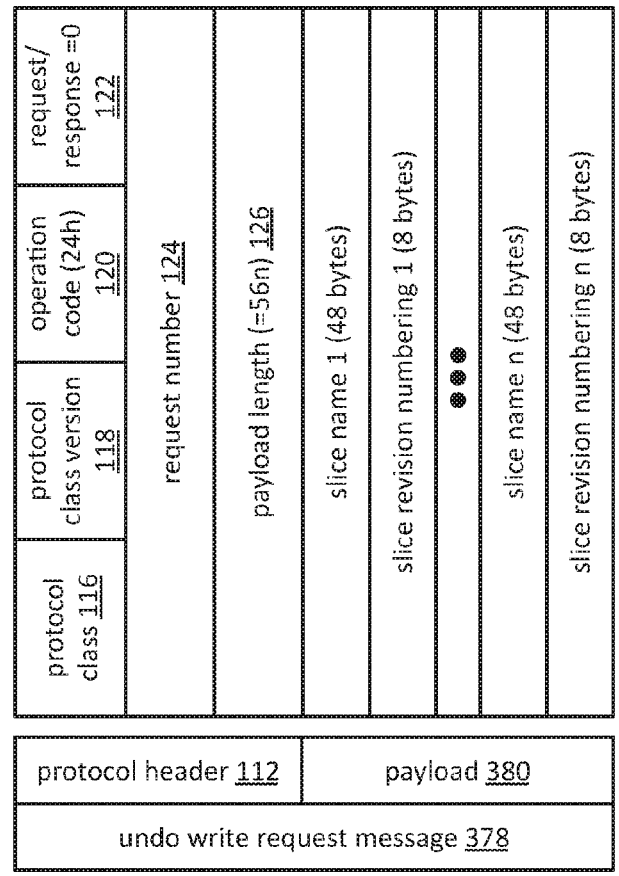
FIG. 19A is a diagram illustrating an example of an undo write request message format in accordance with the invention.

FIG. 19A is a diagram illustrating an example of a DSN frame for an undo write request, which is one of the conclusive write request operations. The request DSN frame includes a protocol header 112 and a payload 380. The protocol header 112 includes one or more of a protocol class field 116, a protocol class version field 118, an operation code field 120, a request/response field 122, a request number field 124, and a payload length field 126. For example, the operation code field 120 includes an operation code value of 24 hex and the request/response field 122 includes a value of zero when the request DSN frame corresponds to the undo write request operational function.

The payload 380 includes one or more slice name fields 1-n, each of which includes a slice name corresponding to a write commit response, and slice revision numbering fields 1-n, each of which includes a slice revision number corresponding to an associated slice name.

FIG. 19B is a flowchart illustrating an example of generating an undo write request (DSN) frame, which includes similar steps to FIGS. 6D and 17B. The method begins at step 382 where a processing module generates fields of a protocol header to include values of the fields of the protocol header. Step 382 includes steps 128-130 of FIG. 6D where the processing module generates a protocol class value for a protocol class field and generates a protocol class version value for a protocol class version field. Such generation of the fields of the protocol header includes generating the protocol class field to indicate a protocol class for the undo write request operation when a threshold number of one or more write commit responses have not been received within a time period and generating the protocol class version field to indicate a protocol class version for the undo write request operation when the threshold number of the one or more write commit responses have not been received within the time period.

The method continues at step 384, which includes steps 132-134 of FIG. 6D, where the processing module generates an operation code field to indicate the undo write request operation (e.g., an operation code value of 24 hex) and generates a request/response value of zero for a request/response field (e.g., indicating a request message) when the threshold number of the one or more write commit responses have not been received. The method continues at step 136 of FIG. 6D where the processing module determines a request number value for a request number field.

The method continues at step 388 where the processing module generates a payload of the request DSN frame by generating one or more slice name fields and one or more slice revision number fields. A slice name field includes a slice name corresponding to a write commit response. A slice revision numbering fields includes a slice revision number corresponding to an associated slice name.

The method continues with step 358 of FIG. 17B where the processing module generates a payload length field of the protocol header to include a payload length that represents length of the one or more slice name fields and length the one or more slice revision numbering fields. The method continues at step 392 where the processing module populates the protocol header and the payload to produce the undo write request message.

The method continues at step 394 where the processing module outputs the request DSN frame that includes the undo write request message in order of the protocol header and one or more slice field pairs, wherein each of the one or more slice field pairs includes, in order, a slice name field of the one or more slice name fields and a slice revision numbering field of the one or more slice revision numbering fields, wherein the slice revision numbering field is associated with the slice name field.

Alternatively, or in addition to, the processing module generates a plurality of DSN frames regarding the conclusive write request operation, wherein the plurality of DSN frames includes the request DSN frame. Alternatively, or in addition to, the processing module updates a slice status table to indicate that slice names of the payload of the undo write request message are now not associated with a write-lock status since they are now an undo status and hence a previous write request operational function has concluded (e.g., a write transaction has expired).

Figure 20B:
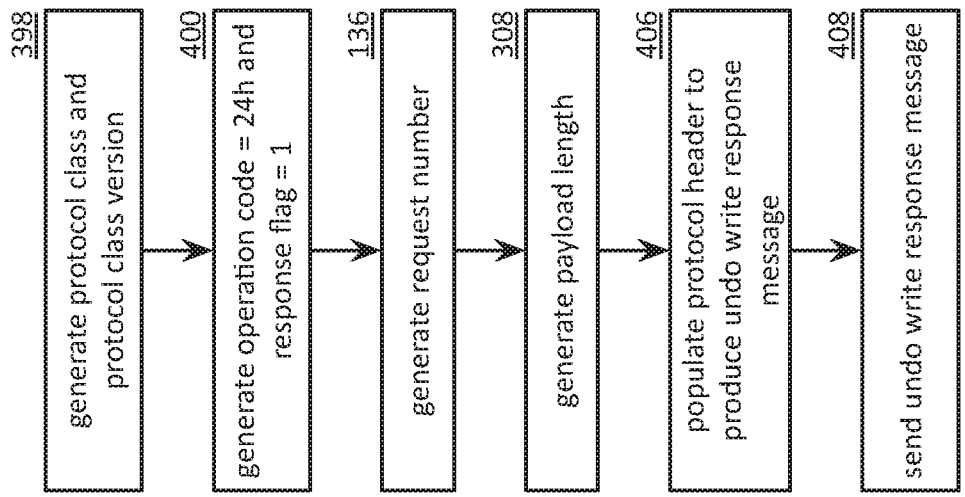
FIG. 20B is a flowchart illustrating an example of generating an undo write response message in accordance with the invention.
Figure 20A:
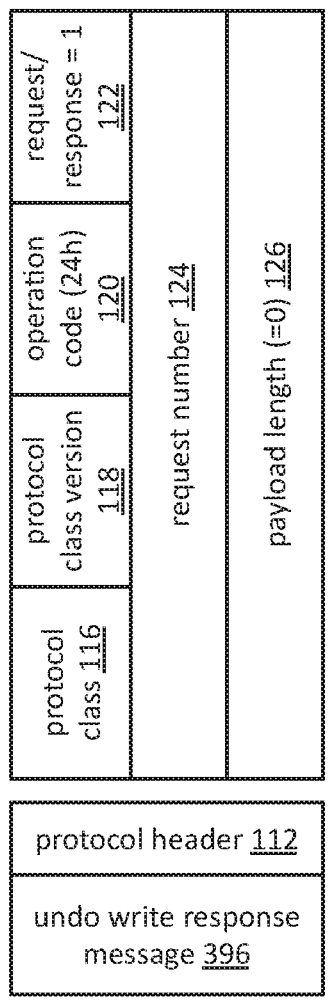
FIG. 20A is a diagram illustrating an example of an undo write response message format in accordance with the invention.

FIG. 20A is a diagram illustrating an example of DSN frame for an undo write response, which is one of the conclusive write response operations. The frame 396 includes a protocol header 112, which includes one or more of a protocol class field 116, a protocol class version field 118, an operation code field 120, a request/response field 122, a request number field 124, and a payload length field 126. For example, the operation code field 120 includes an operation code value of 24 hex, the request/response field 122 includes a value of one, the request number field 124 includes a request number extracted from an associated undo write request message, and the payload length field 126 includes a value of zero when the response DSN frame is associated with the undo write response operational function.

In an operational example, the undo write response message 396 is generated and outputted in response to receiving and processing an associated undo write request message when all encoded data slices corresponding to the undo write request message are successfully undone (e.g., each encoded data slice that corresponds to a revision number of the associated undo write request message is deleted).

FIG. 20B is a flowchart illustrating an example of generating an undo write response DSN frame, which includes similar steps to FIGS. 6D and 14B. The method begins at step 398 where a processing module generates fields of a protocol header to include values of the fields of the protocol header. Step 398 includes steps 128-130 of FIG. 6D where the processing module generates a protocol class value for a protocol class field and generates a protocol class version value for a protocol class version field. Such generation of the fields of the protocol header includes generating the protocol class field to indicate a protocol class for the conclusive write response operation (e.g., the undo write response operation) and generating the protocol class version field to indicate a protocol class version for the conclusive write response operation.

The method continues at step 400, which includes steps 132-134 of FIG. 6D, where the processing module generates an operation code field to indicate the conclusive write response operation (e.g., the undo write response operation associated with an operation code value of 24 hex) and generates a request/response value of one for a request/response field (e.g., indicating a response message). The generating of the operation code field includes creating the undo write response operation or extracting an operational code from a corresponding conclusive write request message (e.g., an undo write request message). The method continues with step 136 of FIG. 6D, where the processing module determines a request number value associated with a conclusive write request operation for a request number field (e.g., the processing module determines the request number by extracting a request number from an associated undo write request message).

The method continues with step 308 of FIG. 14B where the processing module generates a payload length field of the protocol header to include a predetermined payload length value (e.g., zero for the conclusive write response message). The method continues at step 406 where the processing module populates the protocol header to produce the undo write response message. The method continues at step 408 where the processing module outputs in order, the protocol class field, the protocol class version field, the operation code field, the request/response field, the request number field, and the payload length field as the response DSN frame of the undo write response message. Alternatively, or in addition to, the processing module may delete one or more encoded data slices associated with one or more slice names and corresponding one or more revision numbers of the associated undo write request message when the one or more encoded data slices are not associated with a locked status of another open transaction not associated with a current transaction of the conclusive write response operation.

Figure 21B:
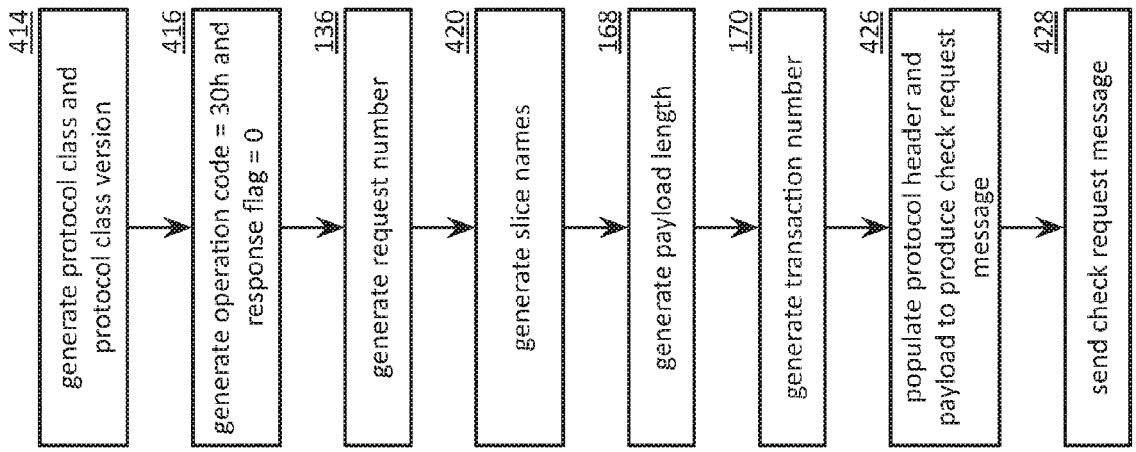
FIG. 21B is a flowchart illustrating an example of generating a check request message in accordance with the invention.
Figure 21A:
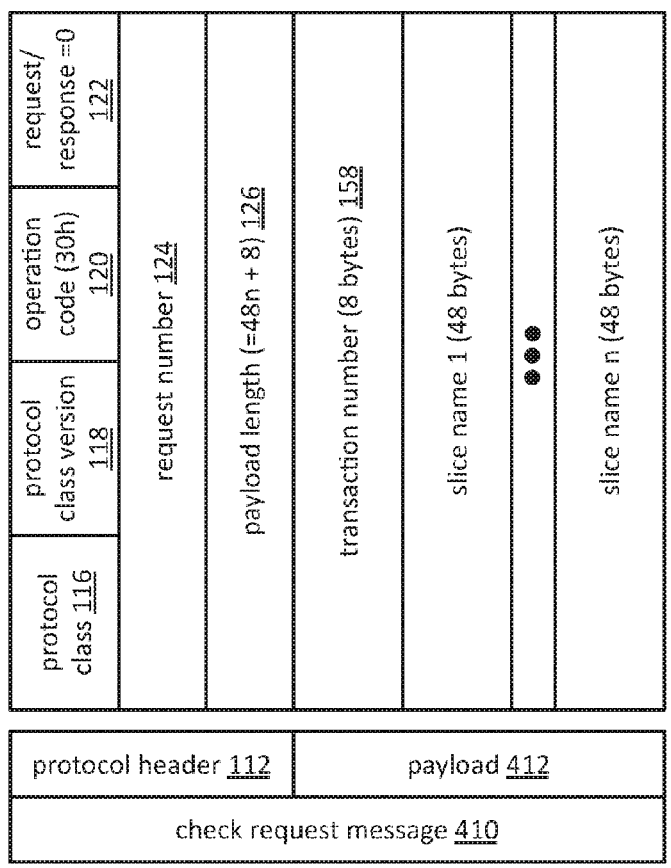
FIG. 21A is a diagram illustrating an example of a check request message format in accordance with the invention.

FIG. 21A is a diagram illustrating an example of a check request DSN frame that includes a protocol header 112 and a payload 412. The protocol header 112 includes one or more of a protocol class field 116, a protocol class version field 118, an operation code field 120, a request/response field 122, a request number field 124, and a payload length field 126. For example, the operation code field 120 includes an operation code value of 30 hex and the request/response field 122 includes a value of zero when the request DSN frame is associated with the check request operational function.

The payload 412 includes a transaction number field 158 that includes a transaction value and slice name fields 1-n, each of which includes a slice name associated with the transaction value. A slice name is associated with an encoded data slice, which is being checked for existence (e.g., stored in a dispersed storage unit) per the check status request. For example, the payload 412 includes a transaction number 158 and three 48 bytes slice name fields that includes slice name 1, slice name 2, and slice name 3 when it is desired to check encoded data slices associated with slice names 1-3. The method to generate the check request message 410 is described in greater detail with reference to FIG. 21B.

FIG. 21B is a flowchart illustrating an example of generating a check request DSN frame to support a check request operation, which include similar steps to FIGS. 6D and 7B. The method begins at step 414 where a processing module generates fields of a protocol header to include values of the fields of the protocol header. Step 414 includes steps 128-130 of FIG. 6D where the processing module generates a protocol class value for a protocol class field and generates a protocol class version value for a protocol class version field. The generation of the fields of the protocol header includes generating the protocol class field to indicate a protocol class for the check request operation and generating the protocol class version field to indicate a protocol class version for the check request operation.

The method continues at step 416, which includes steps 132-134 of FIG. 6D, where the processing module generates an operation code field to indicate a check request operation (e.g., an operation code value of 30 hex) and generates a request/response value of zero for a request/response field. The method continues at step 136 of FIG. 6D where the processing module determines a request number value for a request number field and continues at step 420 where the processing module generates a payload section of the request DSN frame regarding the check request operation by generating one or more slice name fields of the payload section to include one or more slice names corresponding to one or more encoded data slices. The processing module may generate the one or more slice names based on information received in a rebuilder message, a previous check request, a list, a predetermination, a check command, an error message, and a table lookup. For example, the processing module generates 1,000 slice names based on receiving a rebuilder message that includes the 1,000 slice names to check if a corresponding plurality of encoded data slices associated with the 1,000 slice names are stored on a dispersed storage unit.

The method continues with step 168 of FIG. 7B where the processing module generates a payload length field of the protocol header to include a payload length that represents a length of the payload section. The method continues with step 170 of FIG. 7B where the processing module generates a transaction number field of the payload section to include a transaction number value corresponding to the check request operation.

The method continues at step 426 where the processing module populates the protocol header and the payload to produce the check request message. The method continues at step 428 where the processing module outputs the request DSN frame in order of the protocol header, the transaction number field, and the one or more slice name fields. Alternatively, or in addition to, the processing module generates a plurality of DSN frames regarding the check request operation, wherein the plurality of DSN frames includes the request DSN frame. In addition, the processing module may update a slice status table to indicate that the one or more slice names are associated with a read-lock status to prevent any further modifications of associated encoded data slices until steps associated with the check request operation are completed (e.g., encoded data slices are checked in response to the check request message).

Figures 22A, 22B:
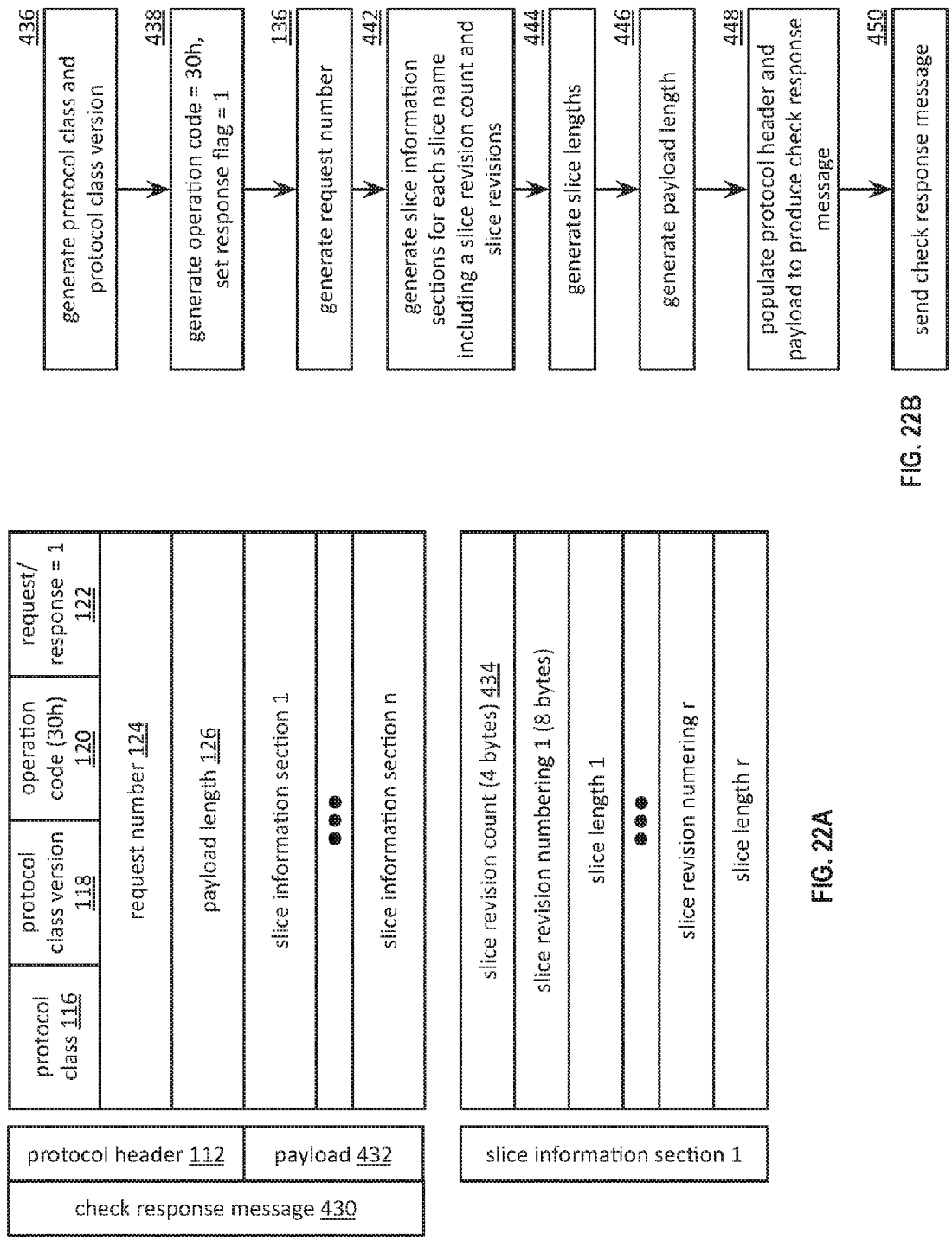
FIG. 22A is a diagram illustrating an example of a check response message format in accordance with the invention.
FIG. 22B is a flowchart illustrating an example of generating a check response message in accordance with the invention.

FIG. 22A is a diagram illustrating an example of a check response DSN frame that includes a protocol header 112 and a payload 432. The protocol header 112 includes one or more of a protocol class field 116, a protocol class version field 118, an operation code field 120, a request/response field 122, a request number field 124, and a payload length field 126. For example, the operation code field 120 includes an operation code value of 30 hex and the request/response field 122 includes a value of one when the response DSN frame is associated with the check response operational function.

The payload 432 includes one or more slice information sections 1-n that correspond to one or more slice names 1-n of an associated check request operational function (e.g., one or more slice names 1-n extracted from a check request DSN frame). Each slice information section includes a slice revision count field 434, one or more slice revision numbering fields 1-r, and one or more slice length fields 1-r, where r represents a slice revision count value of the slice revision count field 434. The slice revision count value indicates a number of visible revisions of an associated slice name included in the slice information section. For example, the slice revision count field is four bytes in length and includes a slice revision count value of 7 when 7 encoded data slices of 7 revisions are visible associated with the corresponding slice name. As another example, the slice revision count value is set to zero when there is no encoded data associated with the corresponding slice name (e.g., the slice may have been deleted).

Each slice revision numbering field 1-r includes a revision number of the associated slice name. For example, a slice revision numbering field is eight bytes in length and includes a revision number that is greater than other revision numbers of the slice name when an encoded data slice associated with the revision number is a latest encoded data slice of the one or more encoded data slices associated with the slice name. Each slice length field 1-r, for each of the revisions of the slice name, includes a length of a corresponding encoded data slice. For example, a slice length field value is set to 2,048 as a number of bytes of the corresponding encoded data slice. As another example, the slice length field value is set to zero when an encoded data slice of the revision of the corresponding slice name does not exist (e.g., the slice was deleted).

FIG. 22B is a flowchart illustrating an example of generating a check response frame to support a check response operation, which include similar steps to FIG. 6D. The method begins at step 436 where a processing module generates fields of a protocol header to include values of the fields of the protocol header. Step 436 includes steps 128-130 of FIG. 6D where the processing module generates a protocol class value for a protocol class field and generates a protocol class version value for a protocol class version field. The generation of the fields of the protocol header includes generating the protocol class field to indicate a protocol class for the check response operation and generating the protocol class version field to indicate a protocol class version for the check response operation.

The method continues at step 438, which includes steps 132-134 of FIG. 6D, where the processing module generates an operation code field to indicate a check response operation (e.g., an operation code value of 30 hex) and generates a request/response value of one for a request/response field. The method continues with step 136 of FIG. 6D where the processing module determines a request number value for a request number field. The method continues at step 442 where the processing module generates a payload of the response DSN frame regarding one or more slice names of the check response operation to include one or more slice information sections. The generating of a slice information section includes generating a slice revision count field to indicate a number of revisions of the slice name and generating a slice revision number field to indicate a number of revisions of the slice name. Note that the slice revision count field may be set to zero when there are no revisions of the slice name (e.g., a deleted encoded data slice).

The method continues at step 444 where the processing module generates a slice length field for each of the revisions of the slice name. The method continues at step 446 where the processing module generates a payload length field of the protocol header to include a payload length that represents a length of the slice information sections. The method continues at step 448 where the processing module populates the protocol header and the payload to produce the check response message.

The method continues at step 450 where the processing module outputs the response DSN frame in order of the protocol header, and the one or more slice information sections, and, within each of the one or more slice information sections, in an order of the slice revision count field, and for each of the revisions of the slice name, the slice revision numbering field and the slice length field. In addition, the processing module may establish an error condition based on one or more of the one or more slice names being associated with a locked encoded data slice state, a transaction number error (e.g., a slice name is locked by a second transaction number different from any transaction number associated with a corresponding read request message), the one or more slice names are associated with one or more encoded data slices that are not locally stored (e.g., a wrong DSN address), and a check request message is not authorized (e.g., a requester is not authorized to access such a portion of a DSN). The processing module discards the response DSN frame when the error condition is established.

FIG. 23A is a diagram illustrating an example of a list range request DSN frame that includes a protocol header 112 and a payload 454. The protocol header 112 includes one or more of a protocol class field 116, a protocol class version field 118, an operation code field 120, a request/response field 122, a request number field 124, and a payload length field 126. For example, the operation code field 120 includes an operation code value of 60 hex and the request/response field 122 includes a value of zero when the request DSN frame is associated with the list range request operational function (e.g., retrieve a list of encoded data slices (or slices names) stored by a DS unit within the range of slices names in the list request).

The payload 454 includes a start slice name range field 456 that includes a start slice name, an end slice name range field 458 that includes an end slice name, and a maximum response count field 460 that includes a maximum response count. The start slice name range field 456 specifies a slice name to start an overall list range request operational function. The end slice name range field 458 specifies a slice name to end the overall list range request operational function. The maximum response count field 460 specifies a maximum number of slice names to list in a subsequent list range response message.

FIG. 23B is a flowchart illustrating an example of generating a list range request DSN frame to support a list range request operation, which includes similar steps to FIG. 6D. The method begins at step 462 where a processing module generates fields of a protocol header to include values of the fields of the protocol header. Step 462 includes steps 128-130 of FIG. 6D where the processing module generates a protocol class value for a protocol class field and generates a protocol class version value for a protocol class version field. The generation of the fields of the protocol header includes generating the protocol class field to indicate a protocol class for the list range request operation and generating the protocol class version field to indicate a protocol class version for the list range request operation.

The method continues at step 464, which includes steps 132-134 of FIG. 6D, where the processing module generates an operation code field to indicate the list range request operation (e.g., an operation code value of 60 hex) and generates a request/response value of zero for a request/response field. The method continues at step 136 of FIG. 6D where the processing module determines a request number value for a request number field.

The method continues at step 468 where the processing module generates a payload section of the request DSN frame regarding the list range request operation by generating a start slice name field of the payload section to include a start slice name of a slice name range. The generating of the start slice name includes one of establishing the start slice name as a first slice name in a spectrum of slice names (e.g., all possible slice names in the system or a portion thereof), establishing the start slice name as an intermediate slice name in the spectrum of slice names, and determining the start slice name based on a response to a previous list range request operation. The spectrum of slice names includes one or more ranges of slice names. For example, the processing module generates the start slice name as a first slice name of a first slice name range of a first spectrum of slice names when a list range request operational function is initiated. As another example, the processing module generates the start slice name as an intermediate slice name of a fifth slice name range of the first spectrum of slice names when the list range request operational function has been initiated but is not finished. As yet another example, the processing module determines the start slice name as a last slice name extracted from a response from a previous list range request operation.

At step 468 the processing module generates an end slice name field of the payload section to include an end slice name of the slice name range. The generating of the end slice name includes one of establishing the end slice name as a last slice name in the spectrum of slice names, establishing the end slice name as a second intermediate slice name in the spectrum of slice names, and determining the end slice name based on the response to the previous list range request operation. For example, the processing module generates the end slice name as a last slice name of a final slice name range of a first spectrum of slice names when the list range request operational function is completing. As another example, the processing module generates the end slice name as a second intermediate slice name of the fifth slice name range of the first spectrum of slice names when the list range request operational function has been initiated but is not finished. As yet another example, the processing module determines the end slice name as the last slice name extracted from the response from the previous list range request operation incremented by an increment value (e.g., a maximum response count).

The method continues at step 470 where the processing module generates a maximum response count field of the payload section to include a maximum slice name response count. The generating of the maximum response count includes at least one of determining the maximum response count based on a number of slice names in the spectrum of slice names, determining the maximum response count based on a DSN performance indicator (e.g., indicating when a very large response message is undesirable), and determining the maximum response count based on the response to the previous list range request operation. For example, processing module generates the maximum slice name response count based on a number of slice names of the previous list range request operation.

The method continues at step 472 where the processing module determines a length of the start slice name field, a length of the end slice name field, a length of the maximum response count field, and generates a payload length for a payload length field based on the length of the start slice name field, the length of the end slice name field, and the length of the maximum response count field. The method continues at step 474 where the processing module populates the payload length field of the protocol header to include the payload length and populates the payload section with the start slice name field, the end slice name field, and the maximum response count field.

The method continues at step 476 where the processing module outputs the request DSN frame in order of the protocol header, the start slice name field, the end slice name field, and the maximum response count field to send a list range request message. Alternatively, or in addition to, the processing module generates a plurality of DSN frames regarding the list range request operation, wherein the plurality of DSN frames includes the request DSN frame.

FIG. 24A is a diagram illustrating an example of a list range response DSN frame that includes a protocol header 112 and a payload 480. The protocol header 112 includes one or more of a protocol class field 116, a protocol class version field 118, an operation code field 120, a request/response field 122, a request number field 124, and a payload length field 126. For example, the operation code field 120 includes an operation code value of 60 hex and the request/response field 122 includes a value of one when the response DSN frame is associated with the list range response operational function.

The payload 480 includes a last slice name field 482, which includes a last slice name of one or more slice names. The last slice name is associated with a last slice information section and/or with one or more slice information sections 1-n that correspond to one or more slice names 1-n of the list range response operational function. Each slice information section 1-n includes a slice name field that includes a slice name, a slice revision count field 484, one or more slice revision numbering fields 1-r, and one or more slice length fields 1-r, where r represents a slice revision count value of the slice revision count field 484. The slice revision count value indicates a number of visible revisions of an associated slice name included in the slice information section. For example, the slice revision count field is four bytes in length and includes a slice revision count value of 4 when 4 encoded data slices of 4 revisions are visible associated with the slice name. As another example, the slice revision count value is set to zero when there is no encoded data slice that is associated with the slice name (e.g., the encoded data slice may have been deleted).

Each slice revision numbering field 1-r includes a revision number of the slice name. For example, a slice revision numbering field is eight bytes in length and includes a revision number that is greater than other revision numbers of the slice name when an encoded data slice associated with the revision number is a latest encoded data slice associated with the slice name. Each slice length field 1-r, for each of the revisions of the slice name, includes a length of a corresponding encoded data slice. For example, a slice length field value is set to 2,048 as a number of bytes of the corresponding encoded data slice. As another example, the slice length field value is set to zero when an encoded data slice of the revision of the corresponding slice name does not exist (e.g., the slice was deleted).

FIG. 24B is a flowchart illustrating an example of generating a list range response (DSN frame to support a list range response operation. The method begins at step 486 where a processing module generates fields of a protocol header to include values of the fields of the protocol header. Step 486 includes steps 128-130 of FIG. 6D where the processing module generates a protocol class value for a protocol class field and generates a protocol class version value for a protocol class version field. The generation of the fields of the protocol header includes generating the protocol class field to indicate a protocol class for the list range response operation and generating the protocol class version field to indicate a protocol class version for the list range response operation.

The method continues at step 488, which includes steps 132-134 of FIG. 6D, where the processing module generates an operation code field to indicate the list range response operation (e.g., an operation code value of 60 hex) and generates a request/response value of one for a request/response field. The method continues with step 136 of FIG. 6D where the processing module determines a request number value for a request number field.

The method continues at step 492 where the processing module determines one or more slice information sections by at least one of determining a number of slice names of one or more slice names in a slice name range associated with a list range request, determining a number of slice names based on a DSN performance indicator, and determining a number of slice names associated with the list range response operation.

The method continues at step 494 where the processing module generates a payload of the response DSN frame regarding the one or more slice names of the list range response operation to include generating a last slice name field to include a last slice name and generating the one or more slice information sections, wherein a slice information section of the one or more slice information sections includes generating a slice name field to include a slice name of the one or more slice names, generating a slice revision count field to indicate a number of revisions of the slice name, generating a slice revision numbering field for each of the revisions of the slice name to include a revision number to produce one or more slice revision numbering fields, and generating a slice length field for each of the revisions of the slice name to include a length of a corresponding encoded data slice.

The method continues at step 496 where the processing module determines the last slice name as a slice name associated with a last slice information section of the one or more slice information sections. Note that the last slice name indicates a starting point for a subsequent list request operational function and may include a last slice name of a slice name range associated with a dispersed storage unit when there are no more slice names to be listed. At step 496 the processing module generates a payload length field of the protocol header to include a payload length that represents a length of the slice name field and the length of the one or more slice information sections. The method continues at step 498 where the processing module populates the protocol header and the payload to produce the list range response message.

The method continues at step 500 where the processing module outputs the response DSN frame in order of the protocol header, the last slice name field, and the one or more slice information sections and, within the slice information section, in an order of the slice revision count field, and, for each of the revisions of the slice name, the slice revision numbering field and the slice length field. In addition, the processing module may establish an error condition based on one or more of the one or more slice names being associated with a locked encoded data slice state, the one or more slice names are associated with one or more encoded data slices that are not locally stored (e.g., a wrong DSN address), and a list range request message is not authorized (e.g., a requester is not authorized to access such a portion of a DSN). The processing module discards the response DSN frame when the error condition is established.

Figures 25A, 25B:
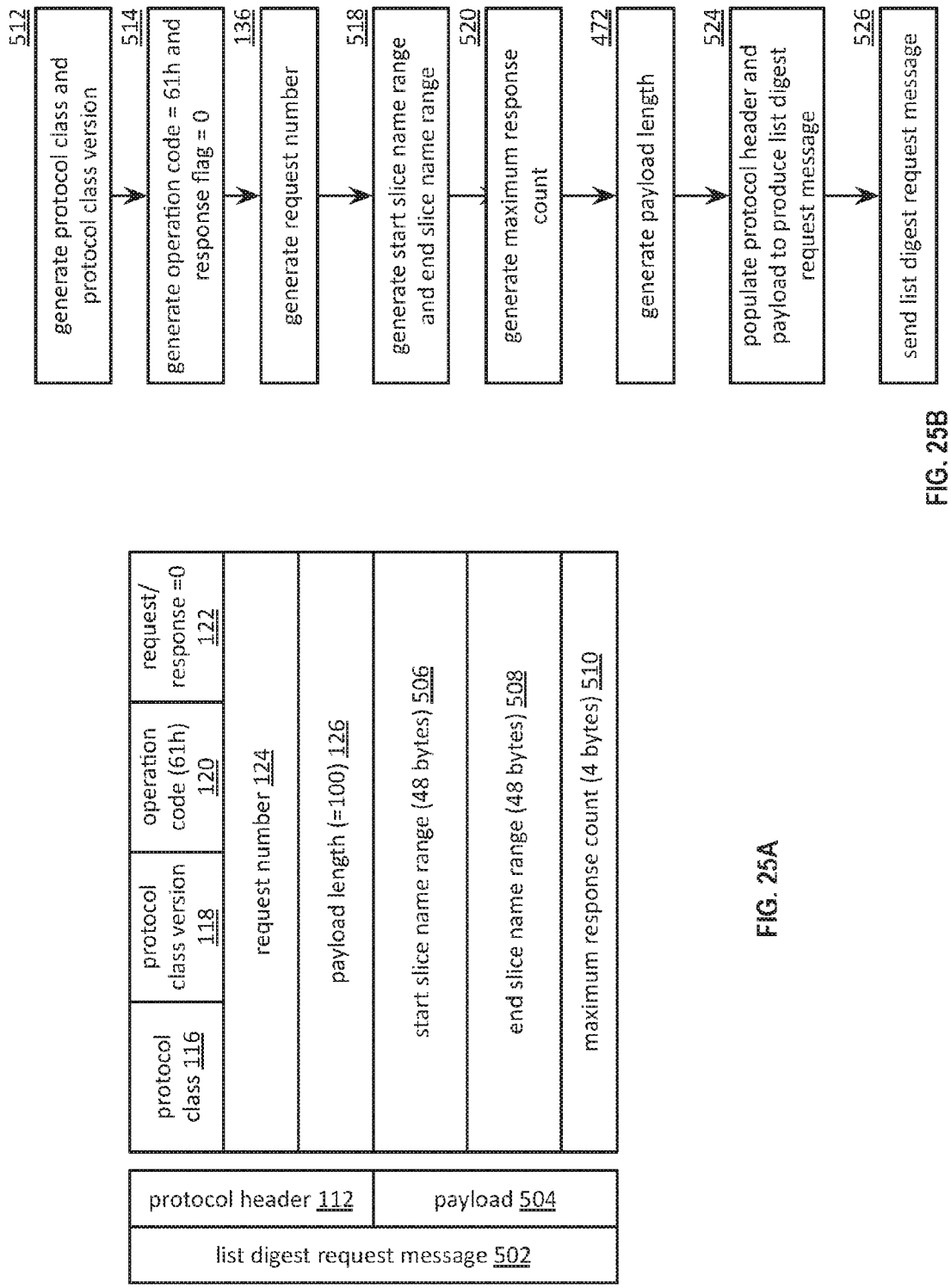
FIG. 25A is a diagram illustrating an example of a list digest request message format in accordance with the invention.
FIG. 25B is a flowchart illustrating an example of generating a list digest request message in accordance with the invention.

FIG. 25A is a diagram illustrating an example of a list digest request DSN frame that includes a protocol header 112 and a payload 504. The protocol header 112 includes one or more of a protocol class field 116, a protocol class version field 118, an operation code field 120, a request/response field 122, a request number field 124, and a payload length field 126. For example, the operation code field 120 includes an operation code value of 61 hex and the request/response field 122 includes a value of zero when the request DSN frame is associated with the list digest request operational function.

The payload 504 includes a start slice name range field 506 that includes a start slice name, an end slice name range field 508 that includes an end slice name, and a maximum response count field 510 that includes a maximum response count. The start slice name range field 506 specifies a slice name to start an overall list digest request operational function. The end slice name range field 508 specifies a slice name to end the overall list digest request operational function. The maximum response count field 510 specifies a maximum number of slice names to include in a digest of the list digest request operational function.

FIG. 25B is a flowchart illustrating an example of generating a list digest request DSN frame to support a list digest request operation. The method begins at step 512 where a processing module generates fields of a protocol header to include values of the fields of the protocol header. Step 512 includes steps 128-130 of FIG. 6D where the processing module generates a protocol class value for a protocol class field and generates a protocol class version value for a protocol class version field. The generation of the fields of the protocol header includes generating the protocol class field to indicate a protocol class for the list digest request operation and generating the protocol class version field to indicate a protocol class version for the list digest request operation.

The method continues at step 514, which includes steps 132-134 of FIG. 6D, where the processing module generates an operation code field to indicate the list digest request operation (e.g., an operation code value of 61 hex) and generates a request/response value of zero for a request/response field. The method continues at step 136 of FIG. 6D where the processing module determines a request number value for a request number field.

The method continues at step 518 where the processing module generates a payload section of the request DSN frame regarding the list digest request operation by generating a start slice name field of the payload section to include a start slice name of a slice name range. The generating of the start slice name includes one of establishing the start slice name as a first slice name in a spectrum of slice names, establishing the start slice name as an intermediate slice name in the spectrum of slice names, and determining the start slice name based on a response to a previous list digest request operation.

At step 518 the processing module generates an end slice name field of the payload section to include an end slice name of the slice name range. The generating of the end slice name includes one of establishing the end slice name as a last slice name in the spectrum of slice names, establishing the end slice name as a second intermediate slice name in the spectrum of slice names, and determining the end slice name based on the response to the previous list digest request operation. For example, the processing module generates the end slice name as a last slice name of a final slice name range of a first spectrum of slice names when the list digest request operational function is completing. As another example, the processing module generates the end slice name as a second intermediate slice name of the fifth slice name range of the first spectrum of slice names when the list digest request operational function has been initiated but is not finished. As yet another example, the processing module determines the end slice name as the last slice name extracted from the response from the previous list digest request operation incremented by an increment value (e.g., a maximum response count).

The method continues at step 520 where the processing module generates a maximum response count field of the payload section to include a maximum slice name response count. The generating of the maximum response count includes at least one of determining the maximum response count based on a number of slice names in the spectrum of slice names, determining the maximum response count based on a DSN performance indicator (e.g., indicating when a very large response message is undesirable), and determining the maximum response count based on the response to the previous list digest request operation. For example, processing module generates the maximum slice name response count based on a number of slice names of the previous list digest request operation.

The method continues at step 472 of FIG. 23B where the processing module generates a payload length for a payload length field. The method continues at step 524 where the processing module populates the payload length field of the protocol header to include the payload length and populates the payload section with the start slice name field, the end slice name field, and the maximum response count field.

The method continues at step 526 where the processing module outputs the request DSN frame in order of the protocol header, the start slice name field, the end slice name field, and the maximum response count field to send a list digest request message. Alternatively, or in addition to, the processing module generates a plurality of DSN frames regarding the list digest request operation, wherein the plurality of DSN frames includes the request DSN frame.

Figure 26B:
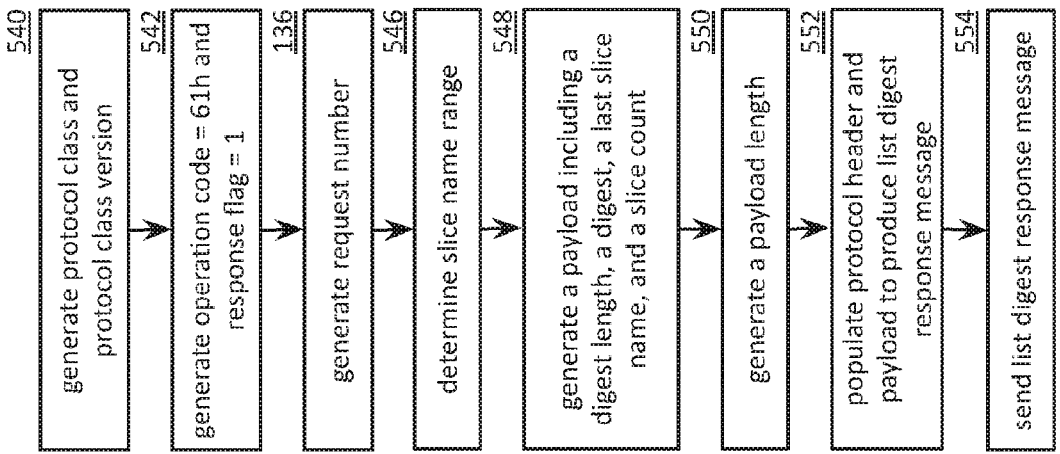
FIG. 26B is a flowchart illustrating an example of generating a list digest response message in accordance with the invention.
Figure 26A:
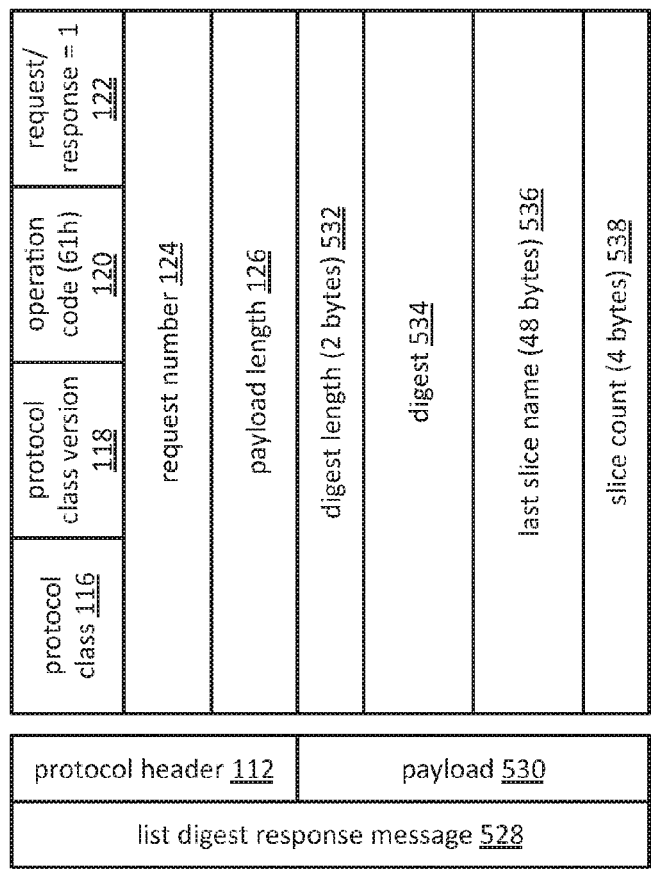
FIG. 26A is a diagram illustrating an example of a list digest response message format in accordance with the invention.

FIG. 26A is a diagram illustrating an example of a list digest DSN frame that 528 includes a protocol header 112 and a payload 530. The protocol header 112 includes one or more of a protocol class field 116, a protocol class version field 118, an operation code field 120, a request/response field 122, a request number field 124, and a payload length field 126. For example, the operation code field 120 includes an operation code value of 61 hex and the request/response field 122 includes a value of one when the response DSN frame is associated with the list digest response operational function.

The payload 530 includes a digest length field 532 including a length of a digest, a digest field 534 that includes the digest, wherein the digest includes a representation of slice names in a slice name range, a last slice name field 536 that includes a last slice name of the slice name range, and a slice count field 538 that includes an indication of a number of slice names of the list digest response operation. For example, the digest length field 532 is two bytes in length and includes a length of 64 bytes when the digest is 512 bits.

Such a slice count field indicates a number of slice names of the list digest response operation that is less than or equal to a value of a maximum response count in a corresponding list digest request message. For example, the slice count field 538 is four bytes in length and includes an indication of 1,000,000 slice names of the list digest response operation when there is at least one visible (e.g., retrievable) revision of an encoded data slice associated with each slice name of 1,000,000 slice names. As another example, the indication of the number of slice names is zero when there are no visible encoded data slices corresponding to slice names within the slice name range.

The representation of slice names in the slice name range includes a hashing function result. For example, the digest represents a hash over a slice name/revision list that includes one or more slice names of the slice name range and one or more corresponding revision numbers for each slice name, wherein each slice name of the one more slice names corresponds to at least one visible encoded data slice.

FIG. 26B is a flowchart illustrating an example of generating a list digest response frame to support a list digest response operation. The method begins at step 540 where a processing module generates fields of a protocol header to include values of the fields of the protocol header. Step 540 includes steps 128-130 of FIG. 6D where the processing module generates a protocol class value for a protocol class field and generates a protocol class version value for a protocol class version field. The generation of the fields of the protocol header includes generating the protocol class field to indicate a protocol class for the list digest response operation and generating the protocol class version field to indicate a protocol class version for the list digest response operation.

The method continues at step 542, which includes steps 132-134 of FIG. 6D, where the processing module generates an operation code field to indicate the list digest response operation (e.g., an operation code value of 61 hex) and generates a request/response value of one for a request/response field. The method continues with step 136 of FIG. 6D where the processing module determines a request number value for a request number field.

The method continues at step 546 where the processing module determines a slice name range based on at least one of a start slice name of a list digest request, an end slice name of the list digest request, a last slice name of a list digest response, and a DSN performance indicator. For example, the processing module determines the slice name range from the start slice name of the list digest request to the end slice name of the list digest request. As another example, the processing module determines the slice name range as half of the slice names from the start slice name to the end slice name of the list digest request when the DSN performance indicator compares unfavorably to a performance threshold (e.g., limited processing availability).

The method continues at step 548 where the processing module generates a payload of the response DSN frame regarding one or more slice names of the list digest response operation by generating a digest length field to include a length of a digest, wherein the digest includes a representation of slice names in the slice name range. The processing module generates a digest field to include the digest, which may be a hash function of at least a portion of a slice name/revision list associated with at least some of a plurality of slices names within the slice name range. The slice name/revision list includes, for a slice name of the plurality of slices names, a slice name of the one or more slice names, a slice revision count indicating a number of revisions of the slice name, one or more slice revision numbers for each of the revisions of the slice name, and one or more slice length indicators corresponding to each of the revisions of the slice name to include a length of a corresponding encoded data slice.

At step 548, the processing module generates a last slice name field to include a last slice name of the slice name range. The generation of the last slice name includes one of selecting an end slice name of the slice name range and using a final slice name as indicated in a list digest request DSN frame. Note that the last slice name indicates a starting point for a subsequent list digest request operational function and may include a last slice name of a slice name range associated with a dispersed storage unit when there are no more slice names to be listed. The processing module generates a slice count field to indicate a number of slice names of the list digest response operation. The generation of the number of slice names of the list digest response operation includes at least one of determining the number based on the plurality of slices names within the slice name range and determining the number based on visible encoded data slices associated with at least some of the plurality of slice names.

The method continues at step 550 where the processing module generates a payload length field of the protocol header to include a payload length that represents a sum of a length of the digest length field, the digest field, the last slice name field, and the slice count field. The method continues at step 552 where the processing module populates the payload section with digest length field, the digest field, the last slice name field, and the slice count field to produce the list digest response message.

The method continues at step 554 where the processing module outputs the response DSN frame in order of the protocol header, the digest length field, the digest field, the last slice name field, and the slice count field to send the list digest response message. Alternatively, or in addition to, the processing module establishes an error condition based on one or more of the one or more slice names being associated with a locked encoded data slice state, the one or more slice names are associated with one or more encoded data slices that are not locally stored, and a list digest message is not authorized. The processing module discards the DSN frame when the error condition is established.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc., described with reference to one or more of the embodiments discussed herein.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method comprises:

sending, by a computing device of a dispersed storage network (DSN), a set of check request messages to a set of storage units of the DSN, wherein a first check request message of the set of check request messages includes a first group of slice names that includes a first slice name from each of a plurality of sets of slice names, wherein a plurality of data segments are dispersed storage error encoded into a plurality of sets of encoded data slices, and wherein the plurality of sets of slice names corresponds to the plurality of sets of encoded data slices;

receiving, by a first storage unit of the set of storage units, the first check request message;

determining, by the first storage unit, a first group of slice information in response to the first check request message;

sending, by the first storage unit, a first check response message to the computing device, wherein the first check response message includes the first group of slice information; and interpreting, by the computing device, the first check response message in light of the first group of slice names to identify one or more encoded data slices of the plurality of sets of encoded data slices in need of rebuilding.

2. The method of claim 1 further comprises:

generating, by the computing device, the first check request message to include a header section and a payload section:

the payload section includes:

a plurality of slice name fields for containing the first group of slice names; and a common transaction number field for containing a common transaction number corresponding to a check request operation; and the protocol header includes one or more of:

a payload length field for containing a payload length that represents a length of the payload section;

an operation code field for containing an indicate the check request operation;

a protocol class field for containing a protocol class for the check request operation; and a protocol class version field for containing the check request operation.

3. The method of claim 1 further comprises:

generating, by the first storage unit, the first check response message to include a header section and a payload section:

the payload section includes a plurality of slice information sections corresponding to the first group of slice information, wherein a first slice information section of the plurality of slice information sections corresponds to a first slice name of the first group of slice names and includes one or more of:

a slice revision count;

a slice revision numbering; and a slice length; and the protocol header includes one or more of:

a payload length field for containing a payload length that represents a length of the payload section;

an operation code field for containing an indicate the check request operation;

a protocol class field for containing a protocol class for the check request operation; and a protocol class version field for containing the check request operation.

4. The method of claim 1, wherein the interpreting the first check response message comprises:

for a first slice name of the first group of slice names, comparing a slice revision number of a first slice information section of a plurality of slice information sections of the first check response message with a known revision level;

when the comparing of the slice revision number compares unfavorably with the known revision level, identifying an encoded data slice associated with the first slice name is in need of rebuilding.

5. The method of claim 1, wherein the interpreting the first check response message comprises:

for a first slice name of the first group of slice names, comparing a slice length of a first slice information section of a plurality of slice information sections of the first check response message with a known slice length; and when the comparing of the slice length compares unfavorably with the known slice length, identifying an encoded data slice associated with the first slice name is in need of rebuilding.

6. The method of claim 1 further comprises:

receiving, by a second storage unit of the set of storage units, a second check request message;

determining, by the second storage unit, a second group of slice information in response to the second check request message;

sending, by the second storage unit, a second check response message to the computing device, wherein the second check response message includes the second group of slice information; and interpreting, by the computing device, the second check response message in light of the second group of slice names to identify one or more other encoded data slices of the plurality of sets of encoded data slices in need of rebuilding.

7. A computer readable memory comprises:

a first memory element that stores operational instructions that, when executed by a computing device of a dispersed storage network (DSN), cause the computing device to:

send a set of check request messages to a set of storage units of the DSN, wherein a first check request message of the set of check request messages includes a first group of slice names that includes a first slice name from each of a plurality of sets of slice names, wherein a plurality of data segments are dispersed storage error encoded into a plurality of sets of encoded data slices, and wherein the plurality of sets of slice names corresponds to the plurality of sets of encoded data slices;

a second memory element that stores operational instructions that, when executed by a first storage unit of the set of storage units, cause the first storage unit to:

receive the first check request message;

determine a first group of slice information in response to the first check request message;

send a first check response message to the computing device, wherein the first check response message includes the first group of slice information; and a third memory element that stores operational instructions that, when executed by the computing device, cause the computing device to:

interpret the first check response message in light of the first group of slice names to identify one or more encoded data slices of the plurality of sets of encoded data slices in need of rebuilding.

8. The computer readable memory of claim 7 further comprises:

a fourth memory element that stores operational instructions that, when executed by the computing device, cause the computing device to:

generate the first check request message to include a header section and a payload section:

the payload section includes:

a plurality of slice name fields for containing the first group of slice names; and a common transaction number field for containing a common transaction number corresponding to a check request operation; and the protocol header includes one or more of:

a payload length field for containing a payload length that represents a length of the payload section;

an operation code field for containing an indicate the check request operation;

a protocol class field for containing a protocol class for the check request operation; and a protocol class version field for containing the check request operation.

9. The computer readable memory of claim 7 further comprises:

a fifth memory element that stores operational instructions that, when executed by the first storage unit, cause the first storage unit to:

generate the first check response message to include a header section and a payload section:

the payload section includes a plurality of slice information sections corresponding to the first group of slice information, wherein a first slice information section of the plurality of slice information sections corresponds to a first slice name of the first group of slice names and includes one or more of:

a slice revision count;

a slice revision numbering; and a slice length; and the protocol header includes one or more of:

a payload length field for containing a payload length that represents a length of the payload section;

an operation code field for containing an indicate the check request operation;

a protocol class field for containing a protocol class for the check request operation; and a protocol class version field for containing the check request operation.

10. The computer readable memory of claim 7, wherein the third memory element stores further operational instructions that, when executed by the computing device, cause the computing device to interpret the first check response message by:

for a first slice name of the first group of slice names, compare a slice revision number of a first slice information section of a plurality of slice information sections of the first check response message with a known revision level;

when the comparing of the slice revision number compares unfavorably with the known revision level, identify an encoded data slice associated with the first slice name is in need of rebuilding.

11. The computer readable memory of claim 7, wherein the third memory element stores further operational instructions that, when executed by the computing device, cause the computing device to interpret the first check response message by:

for a first slice name of the first group of slice names, compare a slice length of a first slice information section of a plurality of slice information sections of the first check response message with a known slice length; and when the comparing of the slice length compares unfavorably with the known slice length, identify an encoded data slice associated with the first slice name is in need of rebuilding.

12. The computer readable memory of claim 7 further comprises:

a sixth memory element that stores operational instructions that, when executed by a second storage unit of the set of storage units, cause the second storage unit to:

receive a second check request message;

determine a second group of slice information in response to the second check request message;

send a second check response message to the computing device, wherein the second check response message includes the second group of slice information; and a seventh memory element that stores operational instructions that, when executed by the computing device, cause the computing device to:

interpret the second check response message in light of the second group of slice names to identify one or more other encoded data slices of the plurality of sets of encoded data slices in need of rebuilding.

\* \* \* \* \*